US012798468B2

(12) United States Patent
Craig

(10) Patent No.: US 12,798,468 B2
(45) Date of Patent: Nov. 17, 2026

(54) HOSE DRIVE SYSTEMS, VEHICLES, AND RELATED METHODS

(71) Applicant: Alamo Group Inc., Seguin, TX (US)

(72) Inventor: Steven W. Craig, Big Bend, WI (US)

(73) Assignee: Alamo Group Inc., Seguin, TX (US)

(*) Notice: Subject to any disclaimer, the term of this patent is extended or adjusted under 35 U.S.C. 154(b) by 298 days.

(21) Appl. No.: 18/393,230

(22) Filed: Dec. 21, 2023

(65) Prior Publication Data

US 2025/0206221 A1 Jun. 26, 2025

(51) Int. Cl.

| | |
|---|---|
| ***B60P 3/22*** | (2006.01) |
| ***F16L 27/08*** | (2006.01) |
| ***F16L 27/12*** | (2006.01) |

(52) U.S. Cl.

CPC ......... *B60P 3/2265* (2013.01); *F16L 27/0861* (2013.01)

(58) Field of Classification Search

CPC .. E03F 7/106; E03F 9/00; A47L 9/248; A47L 9/0036; A47L 9/244; A47L 9/327; A47L 9/009; A62C 27/00; A62C 31/28; B60P 3/2265; B60P 1/60; E01H 1/0827; E01H 2001/0881; A01G 20/47; B65F 3/0209; B65H 2701/33; E02F 3/905; F16L 27/0861; F16L 27/12; F16L 3/01; Y10T 137/6899; Y10T 137/6947; Y10T 137/8807

See application file for complete search history.

(56) References Cited

U.S. PATENT DOCUMENTS

| | | | | |
|---|---|---|---|---|
| 3,627,187 | A | 12/1971 | Hartkopf | |
| 4,246,675 | A | 1/1981 | Costanzo | |
| 5,577,772 | A | 11/1996 | Kaiser | |
| 6,792,646 | B1 * | 9/2004 | Greene | A47L 9/0036 15/340.1 |
| 7,712,481 | B1 | 5/2010 | Mayer | |
| 10,759,324 | B2 * | 9/2020 | Malmassari | B60P 1/60 |

FOREIGN PATENT DOCUMENTS

| | | | |
|---|---|---|---|
| CN | 201679089 | U | 12/2010 |
| CN | 201704788 | U | 1/2011 |
| DE | 8807777 | U1 | 8/1988 |
| DE | 4114837 | A1 | 11/1991 |
| DE | 10246041 | A1 | 4/2004 |
| DE | 102011120115 | A1 | 6/2012 |
| DE | 202016002943 | U | 6/2016 |

(Continued)

*Primary Examiner* — Eric J Zamora Alvarez

(74) *Attorney, Agent, or Firm* — Pizarro Allen PC

(57) ABSTRACT

A vehicle (e.g., a material collection vehicle) may include a hose (e.g., a suction hose), a drive assembly, and a telescopically extendable boom assembly. The hose drive assembly may include a plurality of roller subassemblies adjustably mounted so that the roller subassemblies may be moved to a first position during extension of the hose and moved to a second position during retraction of the hose. The telescopically extendable boom assembly may include a conduit assembly and a support assembly. The conduit assembly and the support assembly may be operably secured together so that telescopic extension of the support assembly drives extension of the conduit assembly. The support assembly may include a drive system including an extension chain and a retraction chain.

13 Claims, 13 Drawing Sheets

(56) References Cited

FOREIGN PATENT DOCUMENTS

| | | | |
|---|---|---|---|
| EP | 0387758 | B1 | 9/1991 |
| EP | 0698696 | B1 | 1/1998 |
| EP | 2874883 | B1 | 3/2016 |
| EP | 3269888 | B1 | 7/2020 |
| JP | 1997084893 | | 3/1997 |
| JP | 2002212969 | | 12/2002 |
| JP | 2017048574 | | 3/2017 |
| KR | 100779448 | | 11/2007 |
| KR | 1018181238 | | 1/2018 |
| WO | WO 9010588 | A1 | 9/1990 |

* cited by examiner

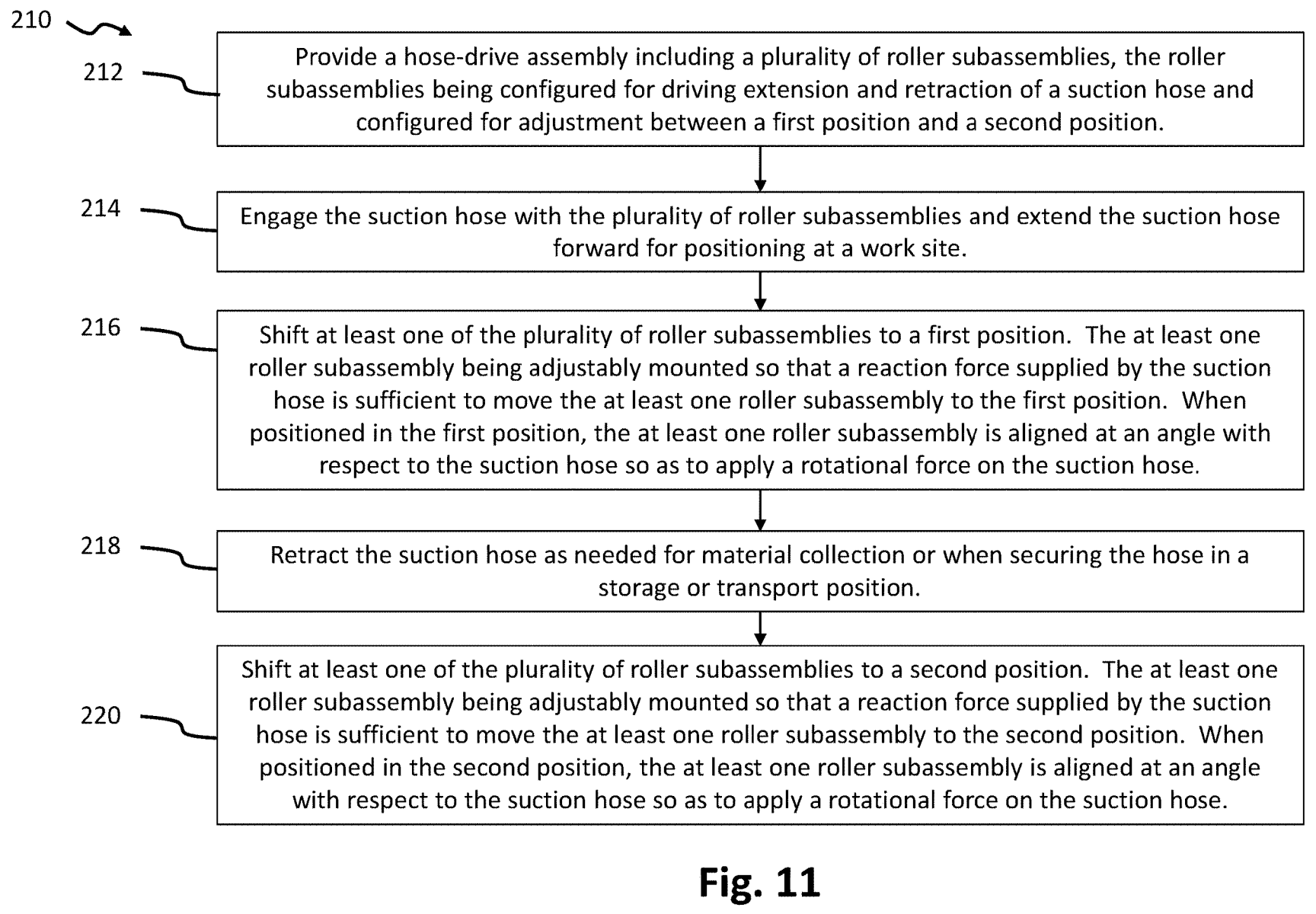

210

212 Provide a hose-drive assembly including a plurality of roller subassemblies, the roller subassemblies being configured for driving extension and retraction of a suction hose and configured for adjustment between a first position and a second position.

↓

214 Engage the suction hose with the plurality of roller subassemblies and extend the suction hose forward for positioning at a work site.

↓

216 Shift at least one of the plurality of roller subassemblies to a first position. The at least one roller subassembly being adjustably mounted so that a reaction force supplied by the suction hose is sufficient to move the at least one roller subassembly to the first position. When positioned in the first position, the at least one roller subassembly is aligned at an angle with respect to the suction hose so as to apply a rotational force on the suction hose.

↓

218 Retract the suction hose as needed for material collection or when securing the hose in a storage or transport position.

↓

220 Shift at least one of the plurality of roller subassemblies to a second position. The at least one roller subassembly being adjustably mounted so that a reaction force supplied by the suction hose is sufficient to move the at least one roller subassembly to the second position. When positioned in the second position, the at least one roller subassembly is aligned at an angle with respect to the suction hose so as to apply a rotational force on the suction hose.

Fig. 11

HOSE DRIVE SYSTEMS, VEHICLES, AND RELATED METHODS

CROSS REFERENCE TO RELATED APPLICATIONS

None.

FIELD

This disclosure relates to vehicles of the type including a hose (e.g., a suction hose or a blower hose) and to hose drive assemblies and booms configured for positioning the hose during its operation.

BACKGROUND

This section is intended to provide a background or context to the invention that is recited in the claims. The description herein may include concepts that could be pursued but are not necessarily ones that have been previously conceived or pursued. Therefore, unless otherwise indicated herein, what is described in this section is not prior art to the description and claims in this application and is not admitted to be prior art by inclusion in this section.

Material or debris collection systems, such as vehicles, may commonly include a suction hose that may be supported by an adjustable mounting system so that the hose may be positioned as needed for debris collection at a work site. These systems may, for example, be used for sewer cleaning, storm drain cleaning, excavation, hydro excavation, leaf or litter collection, or for other suitable purposes. Some material collection systems or vehicles, e.g., vacuum excavators, may include a source of pressurized fluid or a lance configured to break up material or debris prior to its collection. Accordingly, collected material may commonly include residual fluid mixed with other materials present at a work site. More generally, the material collected by a material collection system may include a heterogenous mixture, such as may include solid, liquid, and hardened particulate matter. Such compositions provide challenges when designing cost effective systems for their collection. For example, suction-propelled compositions may inherently wear out the hosing or tubing used for their collection.

Wear caused by suction-propelled material may be particularly problematic in regions of hosing wherein suction-propelled material is routed through one or more turns or bends formed in the hose because particulate material entrained therein must change direction in passing therethrough. In this geometry, particulate material may be driven into the walls of the hosing to impact thereupon and increase wear on the hosing so that it may need to be replaced with some frequency thereby increasing maintenance effort and cost. When a hose settles in a particular orientation, uneven wear of the hose may contribute to its premature failure. Therefore, it is generally advantageous to routinely rotate hosing used in material collection. However, manual rotation of hosing may be more or less difficult in some material or debris collection systems. Of course, this time-consuming operation adds to the overall maintenance cost for the system.

It is common for material collection vehicles to include a boom configured for extension using one or more actuators. Actuators designed for booms of considerable length may be available. However, such actuators may add considerable cost to the boom construction. Moreover, longer actuators may sometimes fail when subjected to stress as may be a problem for booms of considerable length.

Accordingly, there is a need for improved systems for material collection including those that reduce or eliminate a need for manual rotation of hosing used in material collection. There is further a need for improved boom assemblies, including those that reduce a reliance on longer and more costly actuators for driving telescopic boom extension.

SUMMARY

Systems described herein may be directed towards solving the aforementioned problems or other problems. For example, in some embodiments, a vehicle may include an extendable and retractable hose and a hose drive assembly configured for driving extension and retraction of the hose. The hose drive assembly may include a plurality of roller subassemblies, at least one of the plurality of roller subassemblies including a powered roller, the powered roller being adjustably mounted so that it is movable to a first position during extension of the hose and movable to a second position during retraction of the hose. The powered roller may be configured to engage the hose so as to rotate the hose in a direction with the powered roller in the first position and to rotate the hose in the same direction with the powered roller in the second position.

In some embodiments, a vehicle may include a boom assembly and a hose drive assembly. The boom assembly may include a conduit assembly including a hose, the conduit assembly being secured to a telescopically extendable and retractable support assembly. The hose drive assembly may be coupled to the conduit assembly and configured for driving extension and retraction of the hose. The hose drive assembly may include a support plate and a plurality of roller subassemblies mounted to the support plate. Each of the plurality of roller subassemblies may include a bracket, a pivot, and a powered roller. The bracket may include a shaped opening and connect a respective roller subassembly to the support plate. The pivot may be connected to the bracket. The powered roller may be connected to a drive shaft of a motor, the powered roller being adjustably mounted to the bracket via the shaped opening and pivotably mounted to the pivot.

In some embodiments, a vehicle may include a boom assembly including a telescopically extendable and retractable support assembly including a first support, a second support, and a third support. The second support may be configured for nested engagement within the first support, and the third support may be configured for nested engagement within the second support. The boom assembly may further include a conduit assembly including a first conduit and a second conduit, the second conduit configured for nested engagement within the first conduit. The conduit assembly may be secured to the telescopically extendable support assembly so that telescopic extension of the support assembly drives telescopic extension of the conduit assembly. The boom assembly may further include a telescopic actuator including a first end and a second end, the telescopic actuator being mounted to the first support at the first end and mounted to the second support at the second end, wherein extension of the telescopic actuator drives telescopic extension of the second support from the first support. A drive system may be mounted to the support assembly. The drive system may include an extension chain configured for driving telescopic extension of the third support from the second support and a retraction chain configured for driving telescopic retraction of the third support within the second support.

In some embodiments, a hose drive assembly may be configured for driving extension and retraction of a hose. The hose drive assembly may include a plurality of roller subassemblies, at least one of the plurality of roller subassemblies including a powered roller, the powered roller being adjustably mounted so that it is movable to a first position during extension of the hose and movable to a second position during retraction of the hose. The powered roller may be configured to engage the hose so as to rotate the hose in a direction with the powered roller in said first position and to rotate the hose in the same direction with the powered roller in the second position.

In some embodiments, a hose drive assembly configured for driving extension and retraction of a suction hose may include a support plate and a plurality of roller subassemblies mounted to the support plate. Each of the plurality of roller subassemblies may include a bracket, a pivot, and a powered roller. The bracket may connect the roller subassembly to the support plate, the bracket including a shaped opening. The pivot may be connected to the bracket. The powered roller may be connected to a drive shaft of a motor, the powered roller having a mounting shaft adjustably mounted to the bracket in the shaped opening, and the powered roller being pivotably mounted to the pivot.

In some embodiments, a boom assembly may include a telescopically extendable support assembly including a first support, a second support, and a third support. The second support may be configured for nested engagement within the first support, and the third support may be configured for nested engagement within the second support. The boom assembly may further include a conduit assembly including a first conduit and a second conduit, the second conduit configured for nested engagement within the first conduit, the conduit assembly being secured to the telescopically extendable support assembly so that telescopic extension of the support assembly drives telescopic extension of the conduit assembly. A telescopic actuator may include a first end and a second end, the telescopic actuator being mounted to the first support at the first end and mounted to the second support at the second end. Extension of the telescopic actuator may drive telescopic extension of the second support. The boom assembly may further include a drive system mounted to the support assembly. The drive system may include an extension chain configured for driving telescopic extension of the third support from the second support, and a retraction chain configured for driving telescopic retraction of the third support within the second support.

In some embodiments, a vehicle may comprise a hose including a longitudinal axis and a hose drive assembly configured for driving extension and retraction of the hose. The hose drive assembly may include a plurality of roller subassemblies, at least one of the plurality of roller subassemblies including a powered roller, the powered roller including a normal axis forming either of an acute angle or an obtuse angle with a normal of the longitudinal axis of the hose. The powered roller may be configured for applying a force on the hose so as to rotate the hose in either a clockwise or a counterclockwise direction when viewed from the front side of the hose drive assembly.

BRIEF DESCRIPTION OF THE DRAWINGS

In FIG. 3, the boom is shown in a partially extended configuration.

FIG. 11 is a flow chart of an exemplary embodiment of a method for rotating a suction hose.

DETAILED DESCRIPTION

Figure 1:
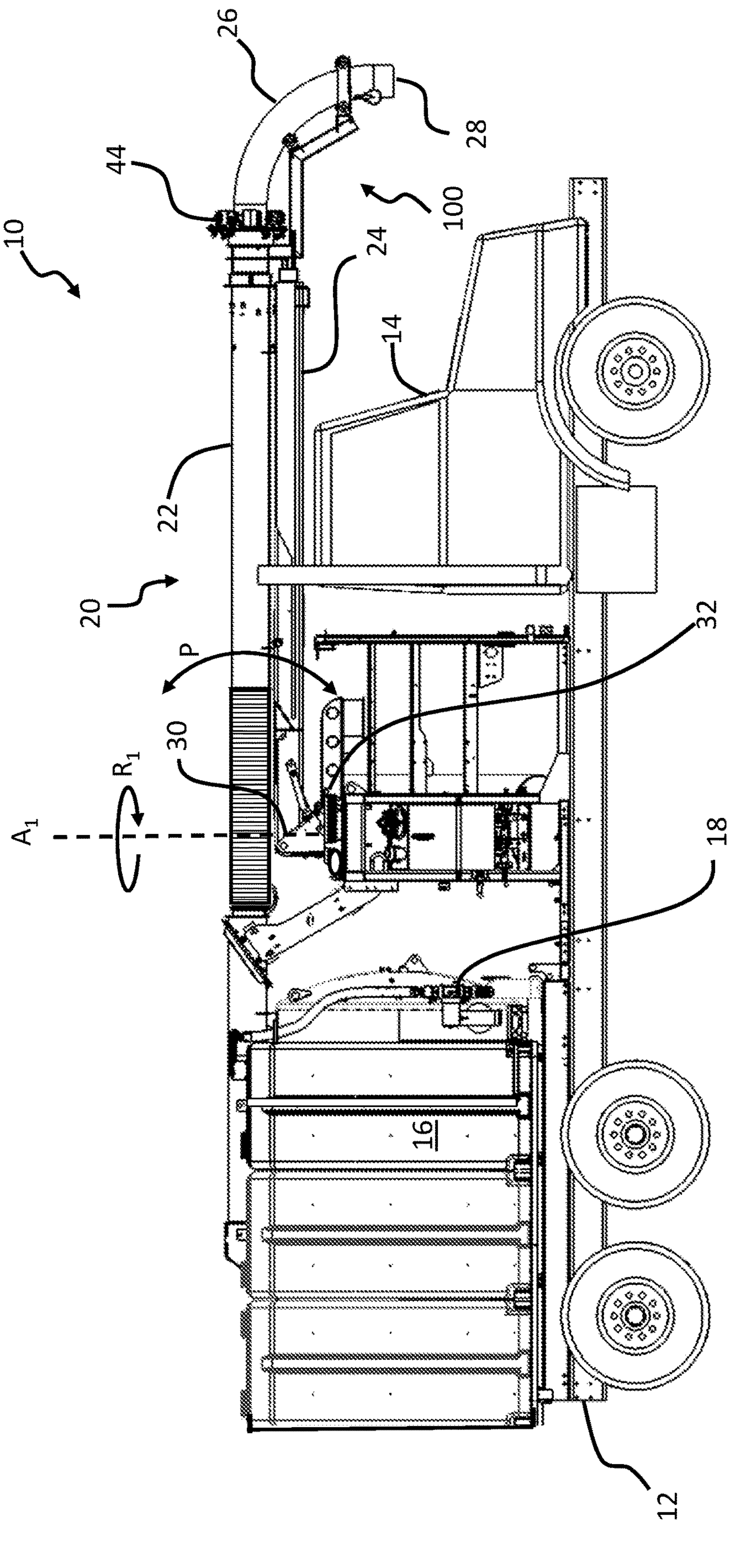
FIG. 1 is a right-side elevation view of an exemplary embodiment of a material collection vehicle including a boom assembly and a hose drive assembly.

As used herein, the following terms should be understood to have the indicated meanings:

When an item is introduced by “a” or “an,” it should be understood to mean one or more of that item.

“Comprises” means includes but is not limited to.

“Comprising” means including but not limited to.

“Having” means including but not limited to.

The terms “proximal” and “distal” may be used herein to denote proximity of a component to the body of a vehicle. For example, the proximal end of a boom assembly or other structure connected to the boom assembly refers to the end of the component that is positioned closer to the vehicle body when the boom assembly is mounted thereto. The distal end refers to the end of the component that is further from the vehicle body when the boom assembly is mounted thereto.

This disclosure is generally directed to vehicles of the type including a suction hose and to hose drive assemblies and booms configured for positioning the suction hose during its operation. Related components and methods of use are also described. The vehicles described herein may, for example, be configured for sewer cleaning, storm drain cleaning, excavation, hydro excavation, leaf or litter collection, or for other suitable purposes. Of course, systems and vehicles specialized for different purposes may sometimes include some different components and be configured somewhat differently yet still embody one or more of the inventive features described herein.

In some embodiments, material collection systems as described herein may include a suction hose configured for adjustable positioning as may be needed for debris collection at a work site. The suction hose may, for example, be adjusted for positioning by increasing a length in which the hose extends outwards from a conduit in which it is slidably engaged. A hose drive assembly may be used to facilitate extension and/or retraction of the suction hose. A hose drive assembly may, for example, be engaged with the suction hose and mounted to a boom assembly of a material collection system or vehicle. Alternatively, the hose drive assembly may be engaged with the suction hose and mounted to the body of a vehicle in some other way including, for example, with or without a boom.

In some embodiments, material collection systems as described herein may include a boom configured for telescopic extension and/or retraction. The boom may include a support assembly comprising a plurality of supports. The support assembly may be configured to support and drive extension of a conduit assembly mounted thereto. For example, the support assembly may be secured to the conduit assembly using one or more connectors, such as straps, mounts, or brackets, for example, so that movement of the support assembly drives corresponding movement of the conduit assembly. In this disclosure, where reference is made to a "boom assembly" in a system or vehicle wherein a support assembly is used to support and/or drive telescopic extension of a conduit assembly, it should be understood that such may refer to the support assembly, the conduit assembly, and other components mounted thereto.

In some embodiments, one or more linear actuators may be used to drive telescopic extension and retraction of a boom assembly. In this specification, an actuator configured to drive telescopic extension and/or retraction of a boom assembly may sometimes be referred to as a telescopic extension and/or retraction actuator or simply a telescopic actuator. One or more other actuators may, for example, be used to drive pivoting motion of the boom assembly upwards or downwards, or side to side, or a combination thereof relative to the vehicle body or to control other types of movements of the boom assembly.

In some embodiments, one or more telescopic extension and/or retraction actuators or other actuators described herein may, by way of nonlimiting example, be powered hydraulically, electrically, pneumatically, or with some other suitable source of power or a combination thereof. For example, a telescopic extension and/or retraction actuator may be a hydraulic actuator and may include a hydraulic cylinder configured to maintain or receive hydraulic pressure used to drive extension and/or retraction of an extendable and retractable piston. In some embodiments, an actuator may be powered in extension using one of the aforementioned power sources, but retraction of the piston may be driven mechanically, using a spring, for example. Thus, for example, actuators used in some embodiments herein may extend when power is provided and automatically retract in the absence or deactivation of a supplied hydraulic or other suitable power source.

In some embodiments, a boom assembly may be comprised of a telescopic actuator that is mounted at or near the proximal end of the boom assembly. For example, the cylinder of a telescopic actuator may be mounted at the proximal end of the boom assembly and secured within a first support comprised of a protective outer cover or shell. The piston of the telescopic actuator may be mounted to a second support. Thus, extension of the telescopic actuator may drive extension and unnesting of the second support from the first support. A third support may be configured for nested engagement with the second support. An internal drive system may be configured for driving telescopic extension of the third support from the second support. Accordingly, full extension of the boom assembly may be driven in combination by the telescopic actuator and the internal drive system. Such embodiments may advantageously provide increased extension length and reduced cost of production and maintenance as compared to some other booms.

In some embodiments, a boom assembly may include a hose drive assembly. The hose drive assembly may, for example, include one or more powered rollers configured so as to engage with and drive extension and/or retraction of a suction hose. The hose drive assembly may further be configured so that it automatically rotates the suction hose during its operation so as to increase the useful lifespan of the hose.

In some embodiments, rotation of the hose may be controlled through coordinated operation of one or more rollers, each of the one or more rollers being driven by a suitably controlled motor, such as a servo motor, for example. A control system may help to position or otherwise control the one or more rollers so as to affect rotation of the hose. The rotation of the hose may be controlled so that the hose does not set in one orientation during its operation. For example, a position of one or more rollers may be periodically adjusted so that the hose is continuously or periodically rotated in such a way so as to prevent the hose from settling in a particular way during its operation.

In some embodiments, the hose drive assembly may engage the suction hose using one or more pivotably mounted roller assemblies. The roller assemblies may be configured to pivot in a first direction upon extension of the suction hose. The roller assemblies may be configured to pivot in a second direction upon retraction of the suction hose. Thus, the hose drive assembly may be configured so as to rotate the suction hose in one direction upon extension and to rotate the suction hose in the same direction upon retraction of the suction hose. In this way, the suction hose may be rotated continuously during operation and do so without becoming seated in a set pattern as is a problem with some other hose drive assemblies. Accordingly, the suction hose will tend to wear evenly during its lifetime thereby increasing its useful lifetime and reducing costs for maintaining the system or vehicle on which the suction hose is mounted.

An exemplary embodiment of a material collection vehicle 10 is shown in FIG. 1. In some embodiments, the material collection vehicle 10 may, for example, be a vacuum excavation vehicle. The vehicle 10 may include a vehicle body 12 and a cab 14. A fluid supply tank 16 and a pump system 18 may be included in the vehicle body 12. The fluid supply tank 16 and pump system 18 may be used to supply pressurized fluid useful for breaking up material or debris prior to its collection. In some embodiments, other vehicle components or systems may be used to condition a pressurized fluid. For example, in some embodiments, material collection vehicle 10 may include a heating element and an associated control panel or set of controls. A heating element may, for example, be included on an excavation vehicle configured for use in cold weather, wherein a heated fluid may be useful to assist in breaking up ice or other solid materials. In some embodiments, material collection vehicle 10 may be configured to supply compressed air as an alternative to or in addition to a pressurized liquid. For example, in some embodiments, material collection vehicle 10 may include an air compression system so that compressed air may be used to help break up material prior to its collection.

The material collection vehicle 10 may include a boom assembly 20. The boom assembly 20 may be comprised of a conduit assembly 22 and a support assembly 24. A hose 26 including an associated inlet 28 for material collection may be provided at the distal end of the boom assembly 20. The hose 26 may, for example, be slidably engaged in the conduit assembly 22 so that it may be extended for positioning as needed at a work site and retracted for storage when not in use. In some embodiments, extension and/or retraction of the hose 26 may be driven by a hose drive assembly 44. Conduit assembly 22 may be connected to and supported by the support assembly 24. Conduit assembly 22 may, for example, be secured to the support assembly 24 using one or more connectors such as straps, mounts, or brackets, for example. Accordingly, movement or extension of support assembly 24 may be translated to movement of the conduit assembly 22. The boom assembly 20 may be telescopically extendable in length so as to help position the hose 26 and associated inlet 28 for material or debris collection.

The support assembly 24 may be connected to the vehicle body 12. For example, in the embodiment shown in FIG. 1, support assembly 24 is mounted to the vehicle body 12 using a knuckle joint 30 and a mounting plate 32. Mounting plate 32 may be supported on one or more bearings (not shown) so that the knuckle joint 30 may rotate ($R_1$) about the rotation axis ($A_1$). Accordingly, the boom assembly 20 may be swung towards the right side (or left side) of the vehicle 10. The support assembly 24 may pivot about the knuckle joint 30 to angle the boom assembly 20 upwards or downwards to assist in positioning the hose 26 for material or debris collection. Material or debris may, for example, be suctioned inwards through the inlet 28 of the suction hose 26 and directed through the conduit assembly 22 for routing to the vehicle body 12 for eventual expulsion, destruction, or routing to a collection tank.

Figure 2:
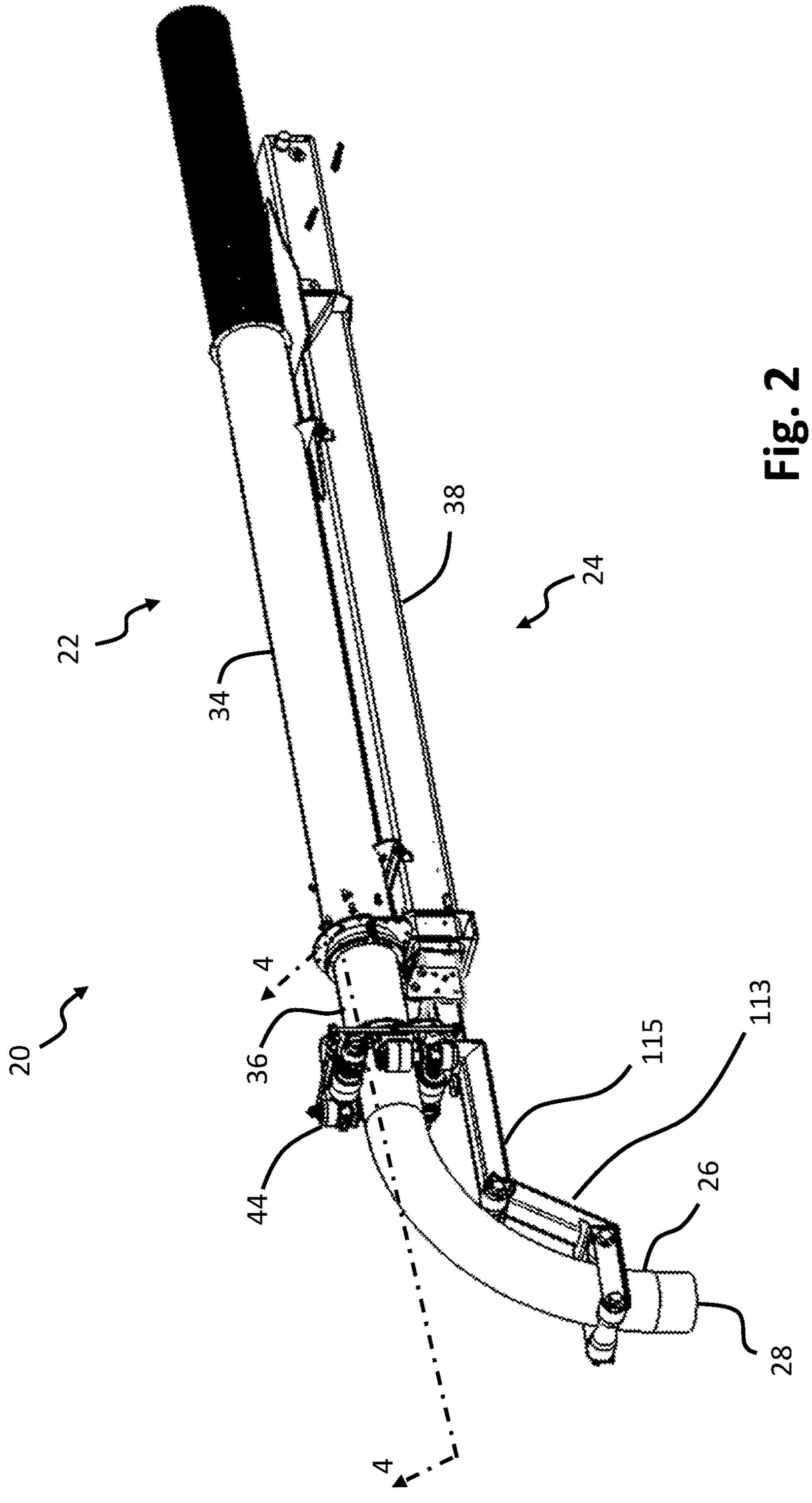
FIG. 2 is a perspective view of one embodiment of a boom assembly in a nearly fully retracted configuration. The boom assembly of FIG. 2 includes a hose drive assembly.
Figure 3:
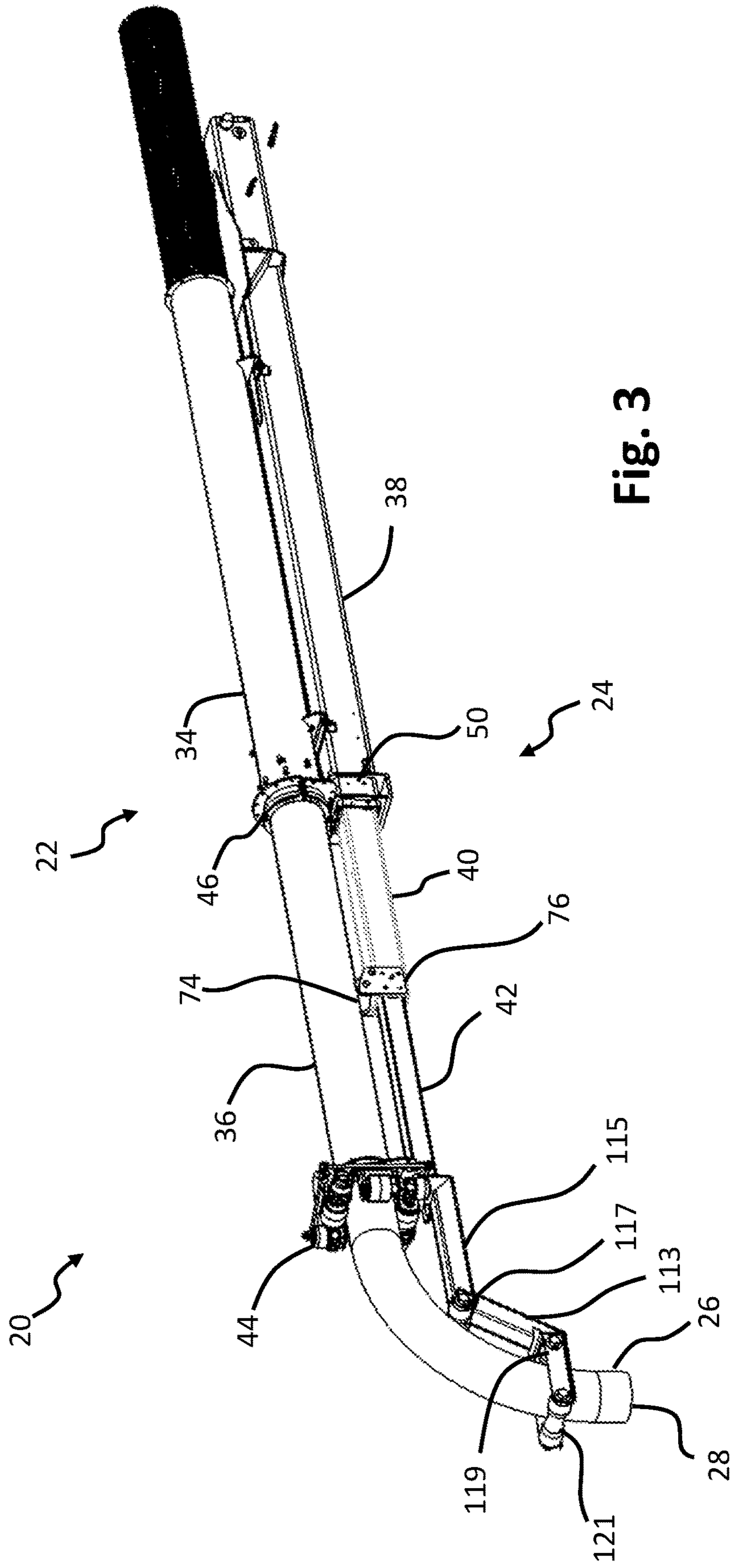
FIG. 3 is another perspective view of the boom assembly shown in FIG. 2.

An exemplary embodiment of boom assembly 20 is shown in FIG. 2 and FIG. 3. FIG. 2 shows a perspective view of the boom assembly 20 shown in a configuration wherein the boom assembly is nearly fully retracted. FIG. 3 shows a perspective view of the boom assembly 20 in a partially extended configuration. The conduit assembly 22 may include one or more conduits configured for nested engagement in another conduit. For example, a first conduit 34 may be configured to slidably receive a second conduit 36 so that the second conduit is nested or tucked within the first conduit and so substantially obscured from view with the boom 20 in the retracted position shown in FIG. 2. As shown in FIG. 3, the second conduit 36 may be telescopically extended from the first conduit 34 so as to make the second conduit clearly visible. A bearing seal 46 may provide for sealing engagement between the first conduit 34 and the second conduit 36 and allow for sliding motion therebetween. As shown in FIG. 2 and FIG. 3, in some embodiments, conduit assembly 22 may be comprised of two conduits 34, 36. However, in other embodiments, a different plurality of conduits may be provided. For example, in some embodiments, two or more conduits may be nested in the first conduit 34.

Conduit assembly 22 may be secured to the support assembly 24 so that movement or extension of support assembly 24 may be translated to movement of the conduit assembly 22. For example, in the embodiment shown in FIGS. 2 and 3, telescopic extension or retraction of the support assembly 24 drives extension and/or retraction of the conduit assembly 22. The support assembly 24 may include a plurality of supports configured for nested engagement. For example, in some embodiments, as best shown in FIG. 3, the support assembly 24 may comprise each of a first support 38, a second support 40, and a third support 42. The first support 38 may comprise an outer cover or shell in which one or more other support sections may be nested. For example, in FIG. 2, second support 40 is nested within the first support 38 and so substantially obscured from view. In FIG. 3, second support 40 is shown telescopically extended from first support 38. The second support 40 may, for example, be telescopically extended from first support 38 using one or more actuators. For example, one or more linear actuators may be used to drive telescopic extension and retraction of the support assembly 24 (as well as conduit assembly 22, linked thereto).

Figure 4:
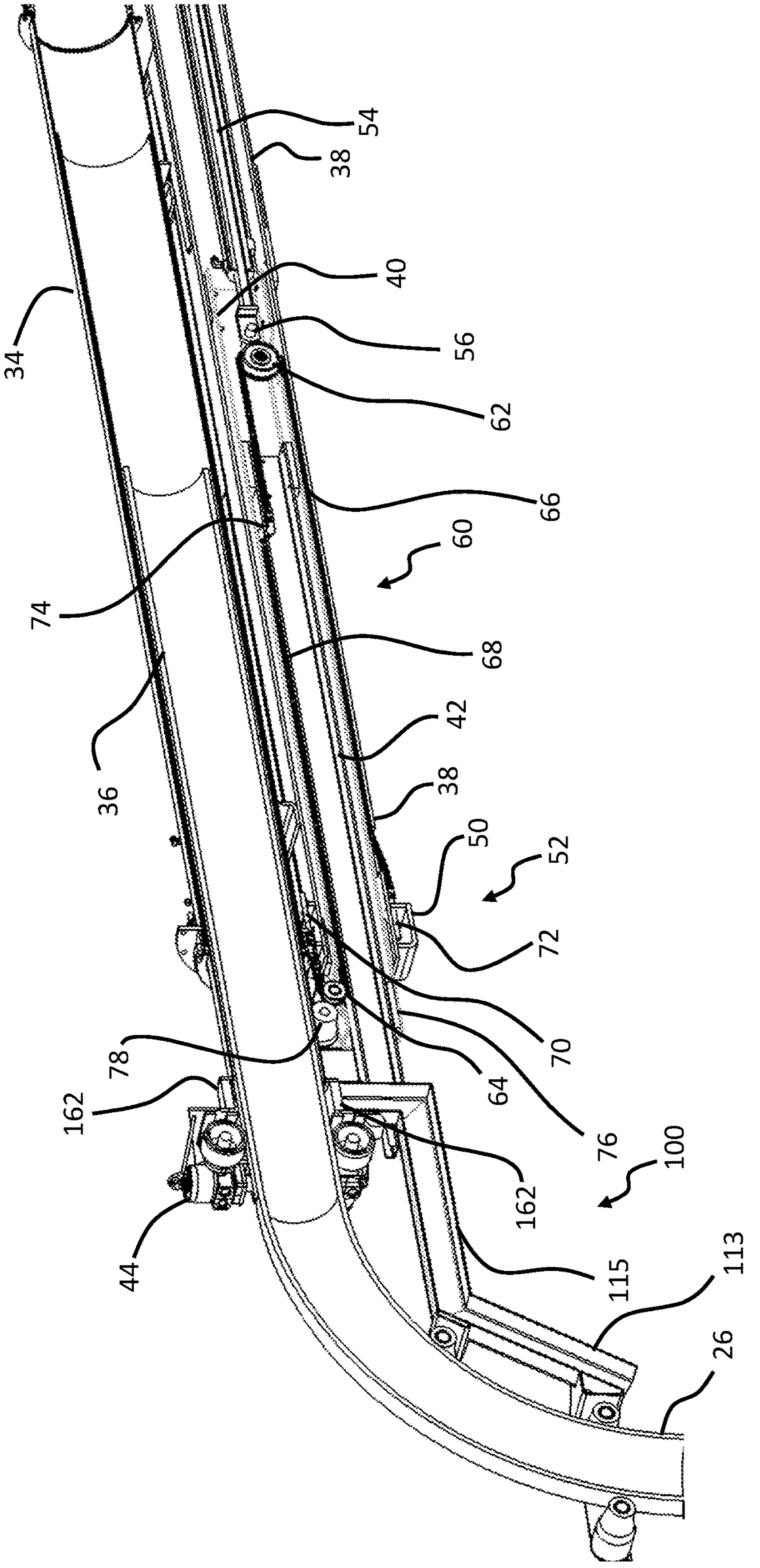
FIG. 4 is a cross-sectional view of the boom assembly of FIG. 2 taken at section 4-4 shown in FIG. 2.

FIG. 4 shows a cross-sectional view of the boom assembly 20 taken at section 4-4 shown in FIG. 2. As shown therein, each of the second support 40 and third support 42 are at least partially nested within the first support 38 in the nearly fully retracted configuration of FIG. 4. The distal end 52 of the first support 38 may be connected to bearing support 50. Bearing support 50 may help to facilitate smooth sliding of the second support 40 over the first support 38 during telescopic extension of the second support. Telescopic extension of the second support 40 may be driven by telescopic extension and/or retraction actuator 54. A proximal end (not shown) of the telescopic actuator 54 may be secured at or near the knuckle joint 30 (e.g., near to a position where the first support 38 is secured to the knuckle joint). The second end of the actuator 54, as shown in FIG. 4, is secured near the proximal end of the second support 40. For example, the actuator 54 may be secured to the second support 40 using a connector 56 in the form of a pin, screw, or bolt, for example.

Third support 42 may be nested, at least in part, within the second support 40. In some embodiments, an inner boom drive system 60 may provide for telescopic extension of the third support 42 and unnesting of the third support from the second support 40. In some embodiments, the drive system 60 may be a chain drive system. The chain drive system 60 may include a proximal end sprocket or pulley 62, a distal end sprocket or pulley 64, a retract chain 66, and an extension chain 68. Pulley 62 may be rotatably mounted to second support 40. Extension chain 68 may, for example, be secured to the bearing support 50 using a first tensioning bolt 70. Retract chain 66 may be secured to the bearing support 50 using a second tensioning bolt 72. Each of the retract chain 66 and the extension chain 68 may be secured to the third support 42. For example, as shown in FIG. 4, the chains 66, 68 may be secured to the third support 42 at link 74 so that they may act on the third support 42 during its extension or retraction. The link 74 may, for example, comprise a curved or S-shaped metal connecting link secured to the third support 42 through a slot, bracket, or opening provided thereon. The link 74 may further connect the retract chain 66 to the extension chain 68. The retract chain 66 may, for example, be pinned to the link 74 at a first end of the link. The extension chain 68 may be pinned to the link 74 at the second end of the link.

The distal end pulley 64 may be secured to a bearing 76. The distal end of the second support 40 is also secured to the bearing 76. Thus, as the second support 40 is telescopically extended from the first support 38, the bearing 76 is also extended. Accordingly, the distance between the bearing 76 and bearing support 50 increases. Because the extend chain 68 is secured to the bearing support 50 (through first tensioning bolt 70) and also engaged with the distal end pulley 64, a progressive length of the extension chain 68 positioned between the bearing 50 and the second bearing 76 increases during extension of the second support 40. Accordingly, the length of the extension chain 68 positioned between the distal end pulley 64 and the link 74 is reduced. Thus, the extension chain 68 effectively pulls on the third support 42 so that it telescopically extends outwards and at least partially unnests from the second support 40 during extension of the second support 40. Likewise, when the second support 40 is telescopically retracted into the first support 38, the retract chain 66 effectively pulls on the third support 42 so that it retracts and becomes at least in part nested within the second support 40.

In some embodiments, extension of the boom assembly 20 may be driven through either or both of telescopic actuator 54 and internal drive system 60. For example, in the partially extended configuration shown in FIG. 3, telescopic actuator 54 may drive telescopic extension of the second support 40. Internal drive system 60 may be used to drive extension of the third support 42 from the second support 40. The connecting bearing 76 may help facilitate extension of the third support 42 from the second support 40. In some embodiments, a roller 78 may be mounted on top of the bearing 76. The roller 78 may help to facilitate extension of the conduit assembly 22 by helping to support the second conduit 36 when the second conduit is sliding out so as to at least partially unnest from the first conduit 34.

In some embodiments, the telescopic actuator 54 may be mounted to the first support 38 at or near its proximal end (e.g., near the knuckle joint 30), providing an efficient weight distribution for the boom assembly 20. Sensitive components of the telescopic actuator 54, such as the end cap of a hydraulic cylinder, may be protected within first support 38 which may provide a secure outer cover or shell for protecting the actuator. The boom assembly 20 may, in general, provide a reduced overall length for the actuator 54 as compared to other designs. For example, in some other boom assemblies (e.g., those without an internal drive system), a single actuator may be used to drive telescopic extension of the boom. To provide the same length of extension as may be provided by embodiments of boom assembly 20 with an internal drive system, a longer actuator may have to be used. Longer actuators may be expensive and/or prone to failure in certain situations. For example, it is common in some booms, particularly telescopic booms that provide large extension lengths, for the distal end of the boom to be subject to at least some degree of strain induced deformation. Some actuators may be particularly prone to failure when subject to such strain. Thus, use of a single actuator or combination of actuators may sometimes be problematic. In some embodiments, an internal drive system 60, as described herein, may be particularly suitable for use at the distal end of a boom where the internal drive system 60 may not be tasked with driving extension of the full weight of the boom. An internal drive system 60 may provide a less expensive and more robust means for adding extension length to a telescopic boom without having to rely on expensive actuators and/or without positioning actuators at the end of the boom where strain induced deformation may sometimes limit the useful lifespan of an actuator.

In some embodiments, conduit assembly 22 may include an extendable and retractable suction hose 26. For example, the hose 26 may be slidably engaged with the second conduit 36 so that the hose may be extended therefrom when needed for positioning at a work site. Likewise, the hose 26 may be retracted as needed, such as when securing the hose for transport or storage, for example. A hose drive assembly 44 may be used to help facilitate extension and/or retraction of the hose 26. The hose drive assembly 44 may be configured so that it automatically rotates the hose 26 during extension and/or retraction of the hose. By rotating the hose 26 during its operation, operators may not need to manually rotate the hose to extend its lifetime. For example, any requirement for operators to manually rotate the hose may be lessened or eliminated.

Figure 5:
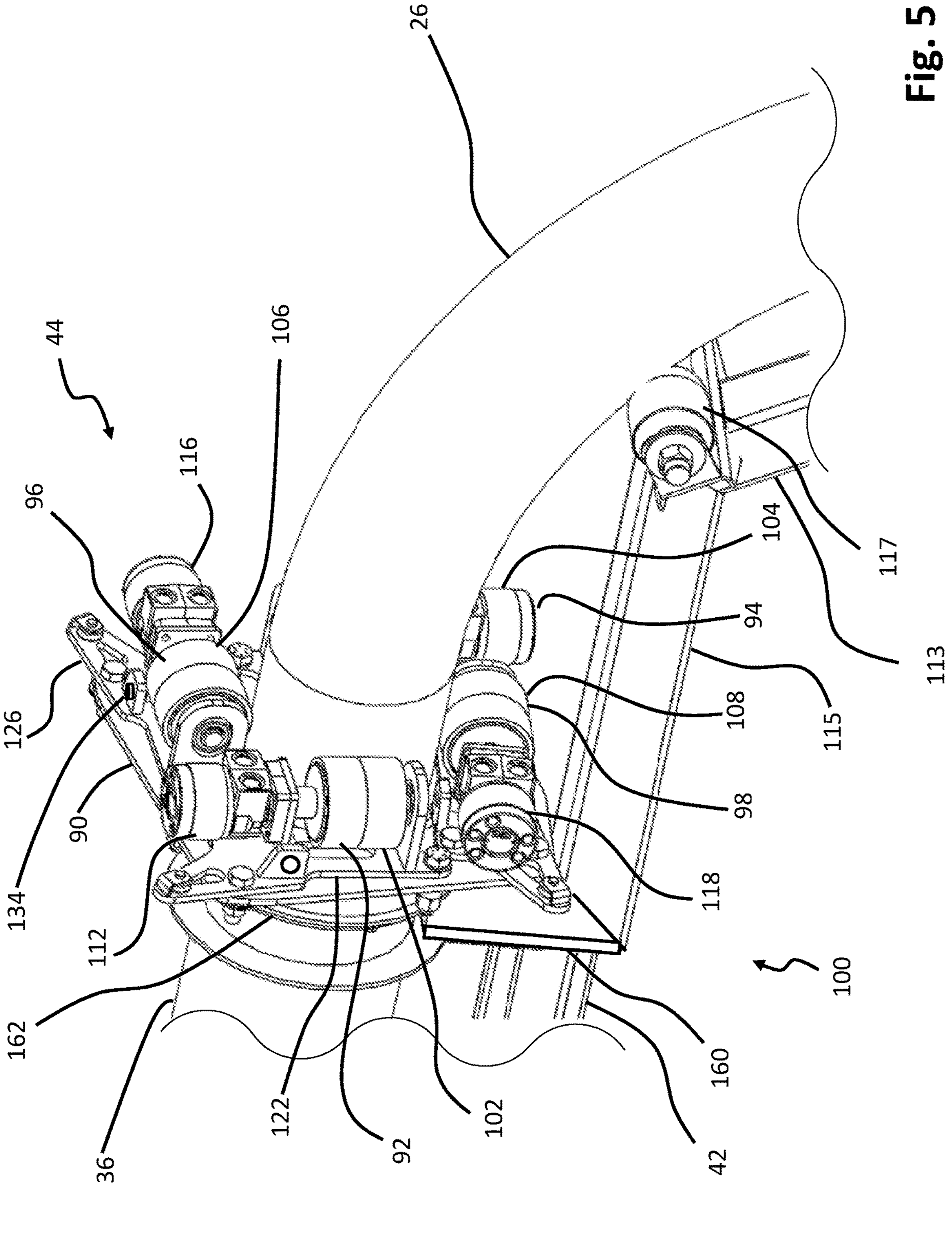
FIG. 5 is a fragmentary perspective view of the boom assembly of FIG. 2, showing a detailed view of the hose drive assembly.
Figure 7:
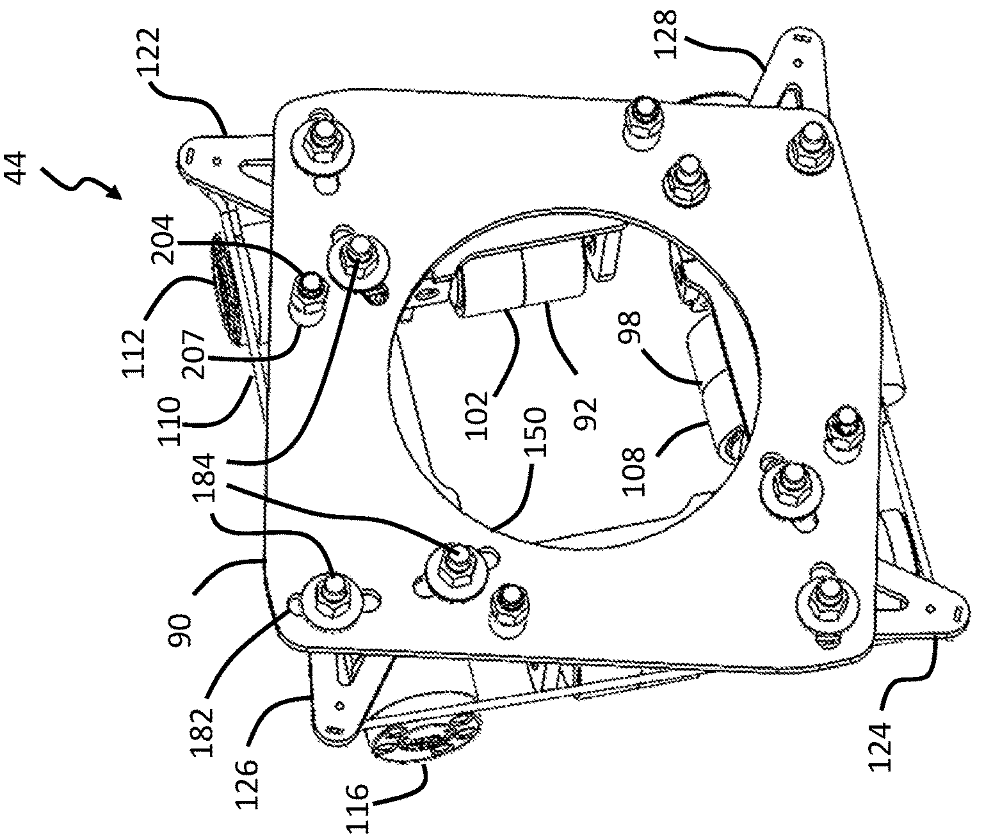
FIG. 7 is a perspective view taken from the back side of the hose drive assembly of FIG. 6.
Figure 6:
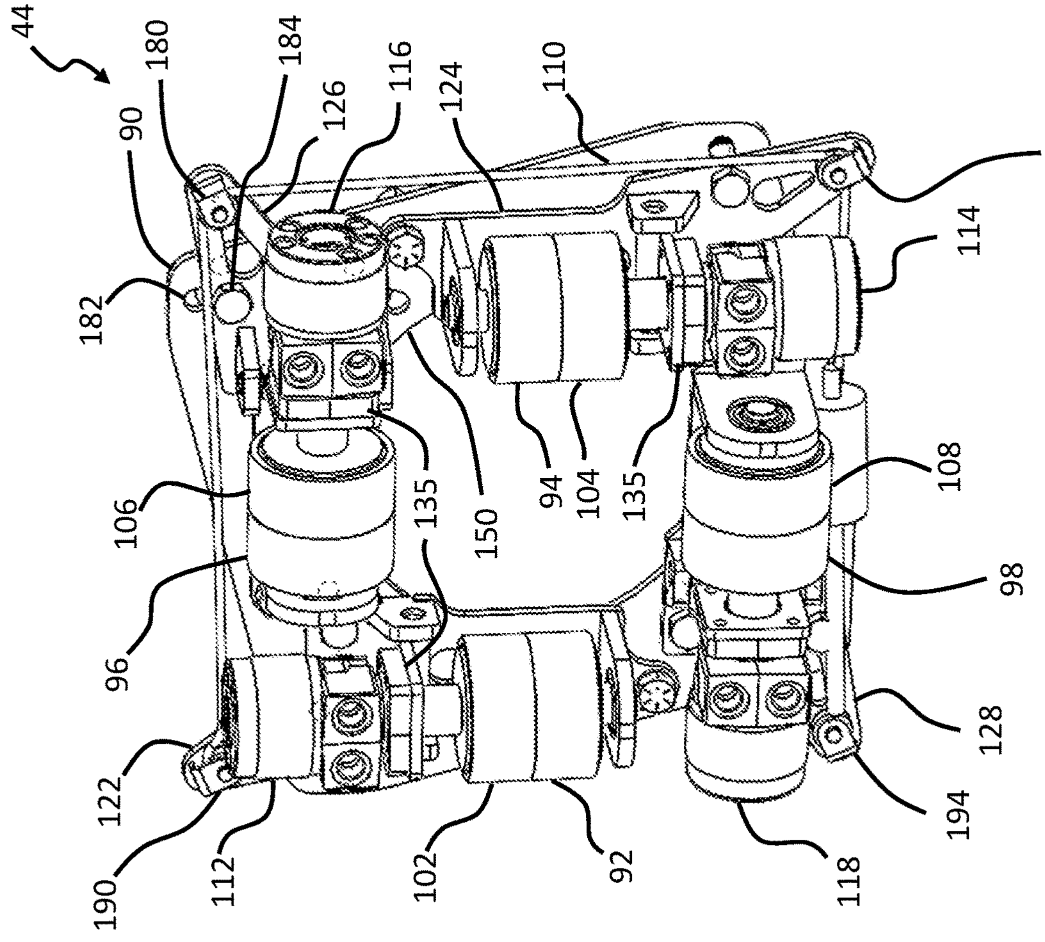
FIG. 6 is a perspective view taken from the front side of an exemplary embodiment of a hose drive assembly.

FIG. 5 is a fragmentary perspective view of the boom assembly 20 of FIGS. 2-4, showing a detailed view of the hose drive assembly 44. The hose drive assembly 44 is further shown in FIG. 6 and in FIG. 7. FIG. 6 shows a front-side view of the hose drive assembly 44. FIG. 7 shows a back-side view of the hose drive assembly 44. Generally, in some embodiments, the hose drive assembly 44 may be mounted at any suitable position wherein it may engage with and drive extension and retraction of the suction hose 26. For example, as shown in FIG. 5, the hose drive assembly 44 may be mounted at or near the distal end of the second conduit 36, where the hose 26 may be slidably engaged with the second conduit and extend or retract therefrom. However, in some embodiments, the hose drive assembly 44 may engage with the suction hose 26 differently. For example, in some embodiments, hose drive assembly 44 may be mounted at another location on the conduit assembly 22 and engage the suction hose 26 through one or more openings or slots formed therein.

In some embodiments, the hose drive assembly 44 may be mounted in the boom assembly 20 so that it moves with extension of the boom assembly 20. For example, in some embodiments, as shown in FIG. 5, the hose drive assembly 44 may be secured in place through a connecting framework 100 of supports. The framework 100 may, for example, comprise the supports 113, 115, 160, 162 and may help to secure the hose drive assembly 44 in place at or near the distal end of the second conduit 36. In some embodiments, the framework 100 may further provide a structure for mounting one or more rollers 117, 119, and 121 (see FIG. 3) or for mounting a hose-support saddle (not shown). The rollers 117, 119, 121 may, for example, be non-driven or passive rollers.

In some embodiments, the hose drive assembly 44 may be comprised of one or more support plates, such as the exemplary support plate 90. The support plate 90 may include a central opening 150 through which the conduit assembly 22 or suction hose 26 may pass through. The support plate 90 may further provide a structure upon which the framework 100 may be connected so as to secure the hose drive assembly 44 in place. The support plate 90 may also provide a structure for mounting one or more roller subassemblies. For example, in some embodiments, each of the one or more roller subassemblies may be removably mounted to the support plate 90 so that damaged roller subassemblies may be replaced if needed. For example, a damaged roller subassembly may be replaced by removing pins 184, 204 (shown in FIG. 7). In some embodiments, as explained further herein in discussion of tensioning cable 110, each of the one or more roller subassemblies may be mounted on a subassembly bracket. The subassembly brackets may be adjustably mounted on the support plate 90 so as to adjust a force of engagement between the one or more roller subassemblies and the suction hose.

In some embodiments, each of the roller subassemblies may be comprised of one or more rollers operatively connected to a drive motor and pivotably connected to a subassembly bracket. For example, in the embodiment shown in FIGS. 5-7, each of a right-side roller subassembly 92, a left-side roller subassembly 94, a top-side roller subassembly 96, and a bottom-side roller subassembly 98 is mounted to the support plate 90. Right-side roller subassembly 92 may be comprised of roller 102. The roller 102 may be connected to a drive motor 112 and pivotably mounted to the right-side roller-subassemblies' bracket 122. Similarly, left-side roller subassembly 94 may be comprised of roller 104, drive motor 114, and bracket 124. Top-side roller subassembly 96 may be comprised of roller 106, drive motor 116, and bracket 126. Bottom-side roller subassembly 98 may be comprised of roller 108, drive motor 118, and bracket 128.

In some embodiments, each of the one or more roller subassemblies may be equivalent. However, in some embodiments, the roller subassemblies 92, 94, 96, and 98 may be different or configured differently. For example, in some embodiments, not all of the roller subassemblies 92, 94, 96, and 98 may be powered. For example, one or more of the roller subassemblies 92, 94, 96, and 98 may comprise a passive or non-driven roller. In one particular example, each of the right-side roller subassembly 92 and the left-side roller subassembly 94 may be powered subassemblies. However, the top-side subassembly 96 and the bottom-side subassembly 98 may be passive or non-driven rollers. In some embodiments, one pair of roller subassemblies on opposite sides of the suction hose 26 may be powered or driven rollers, and another pair of roller subassemblies may be passive or non-driven rollers.

As shown in FIGS. 5-7, in some embodiments, four roller subassemblies 92, 94, 96, and 98 may be provided. In some embodiments, another suitable number of roller subassemblies may be used, such as two to eight roller subassemblies. However, use of four roller subassemblies may be advantageous over some other configurations. For example, some hose drives may use only two rollers, which may be prone to slippage because they may not engage the suction hose with sufficient force. Use of four rollers may help to distribute engagement forces on the hose, allowing for a higher total compression force to be used so as to enhance grip on the suction hose, before the hose is substantially deformed. Particularly, using four rollers as opposed to two rollers may allow for about three times the total force to be applied to the hose for the same stress level on the suction hose.

Figure 8:
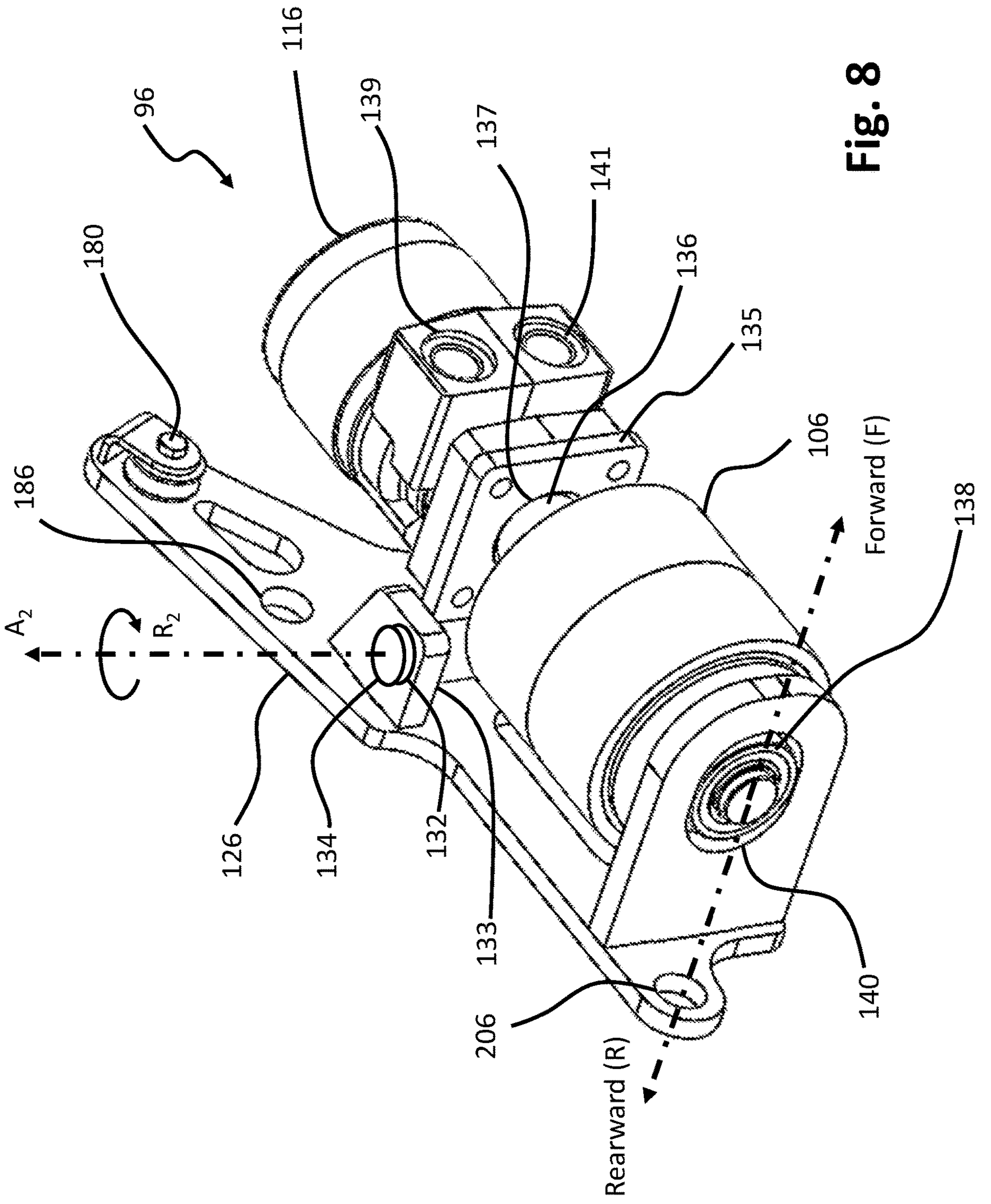
FIG. 8 is perspective view of an exemplary embodiment of a roller subassembly.

FIG. 8 shows a perspective view of one of the roller subassemblies, such as may, in some embodiments, be installed on the support plate 90 as top-side roller subassembly 96, for example. Although roller subassembly 96 is discussed herein, it should be understood that other roller sub-assemblies described herein may operate in a similar manner. As shown in FIG. 8, the bracket 126 may support a pivot opening 132 for receiving a pivot 134, such as in the form of a pivot pin. For example, the pivot opening 132 may be directly formed in the bracket 126, or the pivot opening 132 may be formed in one or more other brackets or extensions 133 connected thereto. The pivot 134 may be aligned along the axis $A_2$ and configured for rotation $R_2$ about the axis $A_2$. The drive motor 116 may include a shaft 136. The shaft 136 may be secured to the roller 106 and configured for powering its rotation. A connecting bracket 135 may be connected to or formed as part of the pivot 134. The bracket 135 may rotate with the pivot 134 and help to secure the roller 106 in place. For example, the bracket 135 may include an opening 137 for receiving the shaft 136 so as to secure the shaft 136, drive motor 116, and roller 106 in place, but still allowing those structures to rotate about the pivot 134. The aforementioned structures 106, 116, 136 may be further supported in place by a bearing 138, which may secure the roller 106 within shaped opening 140. Shaped opening 140 may, for example, be provided in the form of a slot. The bearing 138 may, for example, comprise a sleeve bearing or bushing connected to the roller 106. Shaped opening 140 is shaped so as to allow for controlled movement of the roller 106 connected thereto. For example, the shaft 136 and roller 106 may move in the shaped opening 140 either in a forward direction (F) or in a rearward direction (R). As explained below, with further reference to FIGS. 9A, 9B, 10A, and 10B, movement of the rollers 102, 104, 106, and 108 may facilitate controlled rotation of the suction hose 26 as it is extended and retracted so as to lessen or eliminate a need for manual rotation of the suction hose during its lifetime.

In some embodiments, at least one roller 102, 104, 106, 108 may comprise a driven or powered roller that is adjustably mounted so as to move between a first position and a second position. For example, in some embodiments, as shown in FIG. 8, the first position may be a position wherein a roller 102, 104, 106, 108 is situated rearwardly R in shaped opening 140, and the second position may be a position wherein a roller 102, 104, 106, 108 is situated forwardly F in the shaped opening 140. In some embodiments, a drive motor 112, 114, 116, 118 may be a hydraulic drive motor. For example, in the illustrated embodiment shown in FIG. 8, the drive motor 116 is a hydraulic motor and includes ports 139, 141 for communicating fluid with the hydraulic drive motor. In some embodiments, a drive motor 112, 114, 116, 118 may be driven otherwise, such as electrically or pneumatically, for example.

Figure 9A:
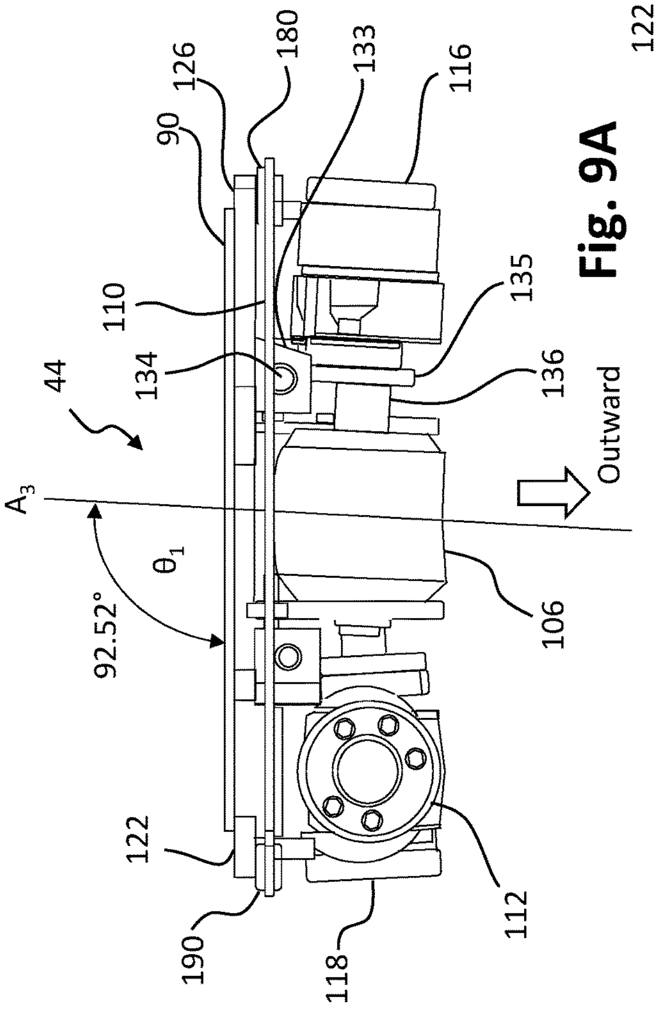
FIG. 9A is a top-side plan view of an exemplary embodiment of a hose drive assembly as it may be positioned when engaged with a suction hose in a process of extending the hose outwards.

FIG. 9A shows a top-side plan view of the hose drive assembly 44 as it may be oriented when the suction hose 26 (not shown in FIG. 9A) is being extended outwards for positioning at a work site. FIG. 10A shows a top-side plan view of the hose drive assembly 44 as it may be oriented when the suction hose 26 (not shown in FIG. 10A) is being retracted inwards. With reference to both FIG. 9A and FIG. 9B (which are schematic diagrams of relevant forces on the hose 26 during hose extension and retraction), when the hose 26 is initially urged forward for extension, the roller 106 may be engaged with the hose, generally, over a contact region 153, and shaft 136 and bearing 138 (and hence roller 106) may be positioned in a neutral position centered on the shaped opening 140. The roller 106 applies a force on the hose 26 in a direction suitable to extend the hose outwards. That is, the roller 106 applies a force on the hose 26 generally along its longitudinal axis. Accordingly, the hose 26 will apply a reaction force on the roller 106 in the opposite direction. The reaction force applied by the hose 26 on the roller 106 may act to move the roller 106 in the rearward direction (as shown in FIG. 8). In response to this reaction force, the roller 106 is moved away from its neutral position, and the overall force supplied by the roller on the hose 26 may no longer be directed substantially along the longitudinal axis of the hose. Rather, as shown schematically in FIG. 9B, when positioned rearwardly in the shaped opening 140, the roller 106 applies a force F directed at an angle relative to the longitudinal axis of hose 26. Particularly, the force F includes a first component $F_1$ directed along the longitudinal axis of the suction hose 26 and a second component $F_2$ that is directed in a transverse direction to the suction hose 26. In this orientation, the force $F_2$ will tend to rotate the hose 26 in the direction shown by $R_3$. For example, the hose 26 may be rotated in a counterclockwise direction (when viewed from the front side of hose drive assembly 44) in response to the force $F_2$ when the hose 26 is being extended.

Figure 10B:
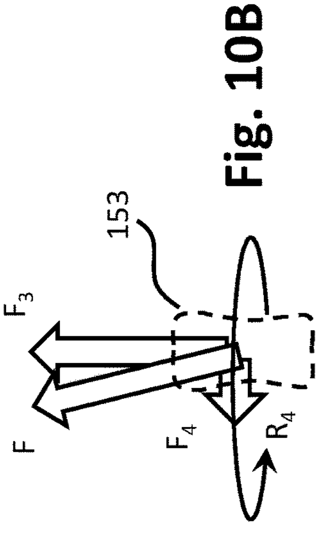
FIG. 10B is a top-side plan view schematic diagram of forces that may be incident on a suction hose when the suction hose is engaged with the hose drive assembly of FIG. 10A.
Figure 10A:
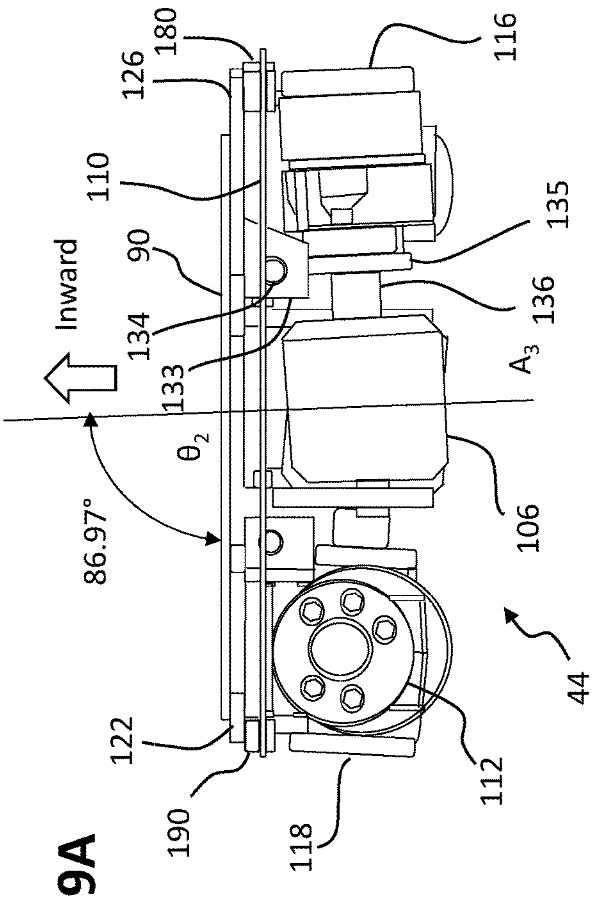
FIG. 10A is a top-side plan view of an exemplary embodiment of a hose drive assembly as it may be positioned when engaged with a suction hose in a process of retracting the hose inwards.

Similarly, with reference to FIG. 10A and FIG. 10B, when the hose 26 is retracted inwards, a reaction force supplied by the hose on the roller 106 will move a neutrally positioned roller forward in shaped opening 140. In this position, the net force F on the hose 26 will include a force $F_3$ directed longitudinally to the hose and a force $F_4$ directed in a transverse direction to the hose. Notably, the forces $F_2$ and $F_4$ are directed in the same direction. Thus, advantageously, the hose 26 will be rotated in one common direction during both extension and retraction. Accordingly, the hose 26 will not rotate in a repetitive manner (e.g., rotating back and forth clockwise and counter-clockwise along a similar path) such as may cause the hose to develop a set pattern during extension and retraction. Such a repetitive rotation would tend to cause the hose to settle during use and potentially lead to uneven wearing of the hose.

As shown in FIG. 9A and FIG. 10A, in some embodiments, the roller 106 may rotate only slightly about the pivot 134 (see FIG. 8). For example, in some embodiments, as shown in FIG. 9A, the angle $\theta_1$, formed between the support plate 90 and the axis $A_3$ (the normal axis of the roller 106), when the roller pivots about the pivot 134 and moves rearwardly in shaped opening 140, may be about 92.52 degrees. In some embodiments, the angle $\theta_1$ formed between the support plate 90 and the roller 106, when the roller 106 pivots about the pivot 134 and moves rearwardly in shaped opening 140, may be between about 91 degrees to about 100 degrees, for example. Likewise, as shown in FIG. 10A, the angle $\theta_2$ formed between the support plate 90 and the axis $A_3$ (the normal axis of the roller 106) when the roller 106 is pivoted and moved in a forward direction in shaped opening 140 may be about 86.97 degrees. In some embodiments, the angle $\theta_2$ formed between the support plate 90 and the roller 106, when the roller 106 is pivoted and moved in a forward direction in shaped opening 140, may be between about 89 degrees to about 80 degrees, for example. However, suitable values for the angles $\theta_1$ and $\theta_2$ may depend, for example, on the material construction of the hose and the rollers, the number of rollers used, and other variables. For example, depending on the number of rollers and the relative traction between the rollers and the hose, a greater or lesser angle may sometimes be used so as to provide a suitable rotation of the hose without significantly deforming the hose. For example, in some embodiments, the rollers 102, 104, 106, 108 may be comprised of steel tubing with a rubber tread or belting bonded or glued to an outer surface of the steel tubing. This steel tubing may be mounted to the shaft of a drive motor powering the roller, or the tubing may comprise the shaft of the drive motor itself.

In some embodiments, a hose drive assembly 44 may comprise a control system for adjusting a contact force between one or more of the rollers 102, 104, 106, and 108 and the suction hose 26. For example, a control system for adjusting the contact force between one or more of the rollers 102, 104, 106, and 108 and the suction hose 26 may comprise a cable 110. The cable 110 may, for example, be secured to the roller subassemblies 92, 94, 96, 98 through a respective bracket 122, 124, 126, and 128 for the roller subassemblies. For example, as shown in FIG. 8, the bracket 126 of top-side roller subassembly 96 includes a pulley 180 for engaging with the cable 110. Additional pulleys 190, 192, 194 may be provided, respectively, for the other roller subassemblies 92, 94, and 98.

In some embodiments, the tension of the cable 110 may be adjustable. For example, in some embodiments, the tension of the cable may be manually adjusted using a tensioning bolt. As the tension of the cable 110 is adjusted, the tensioning cable may apply a force on the respective brackets 122, 124, 126, and 128 for the roller subassemblies 92, 94, 96, 98. The roller subassemblies 92, 94, 96, 98 may be mounted to the support plate 90 via brackets 122, 124, 126, 128 through a first group of bolts or pins 184 and a second group of bolts or pins 204. For example, a pin 184 for top-side roller subassembly 96 may be mounted through the opening 186 (shown in FIG. 8) and through a respective slot 182 formed in the support plate 90 (see FIG. 7). Likewise, a pin 204 (shown in FIG. 7) may be mounted through the opening 206 (shown in FIG. 8) and through a corresponding opening 207 (shown in FIG. 7) formed in the support plate 90. The forces applied by the cable 110 on the respective brackets 122, 124, 126, and 128 may tend to rotate the brackets about the respective pins 204 so that the position of the pin 184 in the slot 182 may be adjusted. In this way, the tension of the cable 110 may be used to adjust the relative orientation between the support plate 90 and the respective roller subassemblies 92, 94, 96, 98 and thereby adjust the strength of engagement of the rollers 102, 104, 106, 108 with the hose 26.

FIG. 11 is a flow chart of an exemplary embodiment of a method 210 for rotating a suction hose. As shown at step 212, a hose drive assembly 44 may be provided. The hose drive assembly 44 may include a plurality of roller subassemblies 92, 94, 96, 98 configured for driving extension and/or retraction of a suction hose 26. Each of the plurality of roller subassemblies may be configured for adjustment between a first position and a second position. For example, in some embodiments, each of the roller subassemblies 92, 94, 96, 98 may comprise a roller 102, 104, 106, 108 pivotably mounted to a respective bracket 122, 124, 126, 128 so that the position of the respective roller 102, 104, 106, 108 may be changed between the first position and the second position. As shown at step 214, the suction hose 26 may be engaged by the roller subassemblies 92, 94, 96, 98 and extended forward for positioning at a work site. At step 216, at least one of the roller subassemblies 92, 94, 96, 98 may be moved to a first position. The at least one roller subassembly may be adjustably mounted so that a reaction force supplied by the suction hose 26 on the at least one roller subassembly, when the suction hose is being extended, is sufficient to move the at least one roller subassembly to the first position. When positioned in the first position, the at least one roller subassembly is aligned at an angle with respect to the suction hose so as to apply a rotational force on the suction hose. At step 218, the suction hose may be retracted. For example, the suction hose may be retracted when securing the suction hose for storage or transport. However, the suction hose may also be retracted and/or extended as needed during positioning at a work site. At step 220, at least one roller subassembly may be moved to a second position. For example, the at least one roller subassembly may be adjustably mounted so that a reaction force supplied by the suction hose 26 on the at least one roller subassembly, when the suction hose is being retracted, is sufficient to move the at least one roller subassembly to the second position. When positioned in the second position, the at least one roller subassembly is aligned at an angle with respect to the suction hose so as to apply a rotational force on the suction hose that rotates the suction hose in the same direction that it rotates during extension. Accordingly, when the suction hose 26 is rotated according to the method 210 it is continuously rotated in the same direction so as to prevent the suction hose from rotating back and forth along a repetitive path that may lead the suction hose to settle into a set pattern and wear unevenly during its lifetime.

Figure 13:
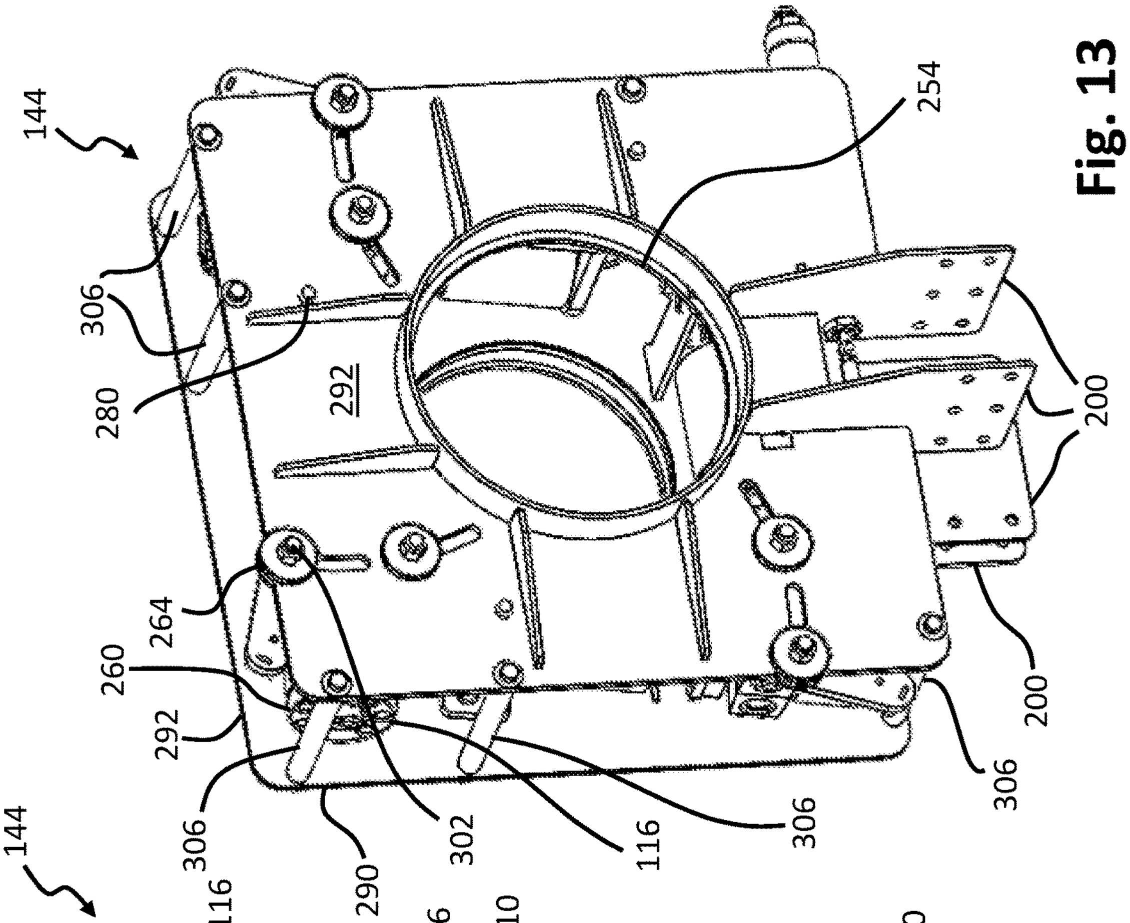
FIG. 13 is a perspective view taken from the back side of the hose drive assembly of FIG. 12.
Figure 12:
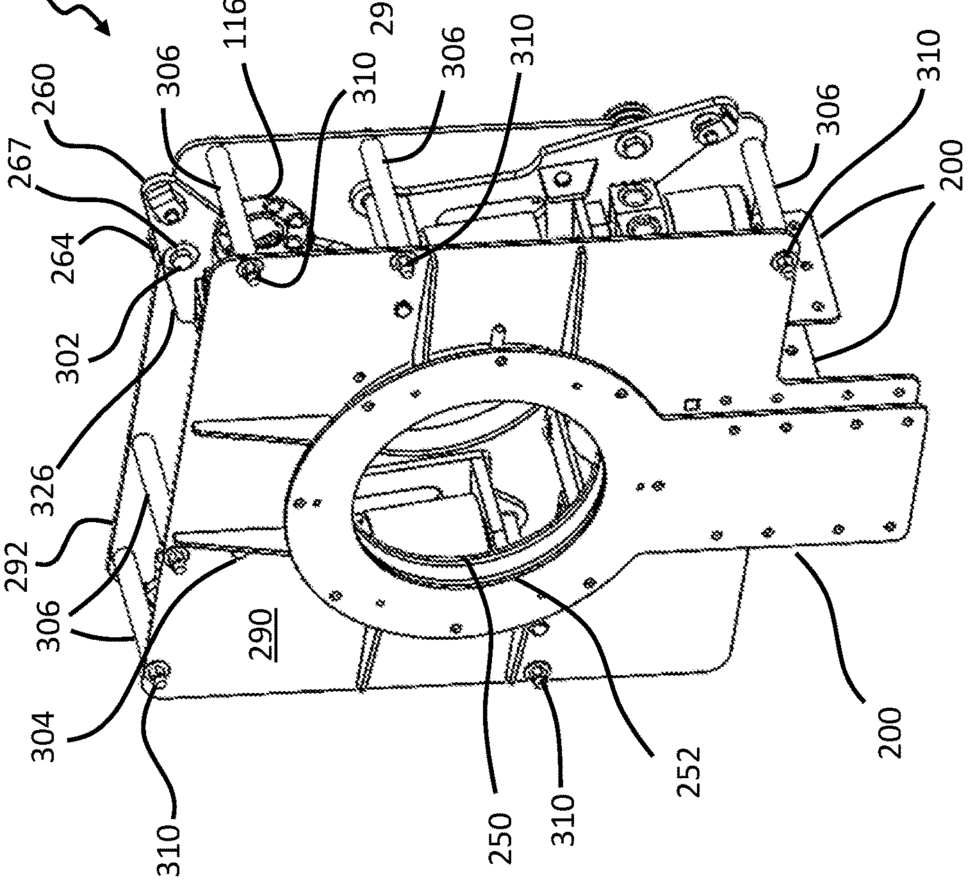
FIG. 12 is a perspective view taken from the front side of another exemplary embodiment of a hose drive assembly.

In some embodiments, a hose drive assembly may be secured in place to a conduit assembly so that it may engage with a suction hose using one or more support plates. For example, in some embodiments, as shown in FIG. 5, hose drive assembly 44 may be secured at or near the distal end of second conduit 36 using the support plate 90 and connecting framework 100 so that it is positioned for engagement with the suction hose 26. In some embodiments, a hose drive assembly may be secured in place so that it may engage with a suction hose using two or more support plates and a supporting framework. For example, FIG. 12 is a perspective view taken from the front side of an exemplary embodiment of a hose drive assembly 144. FIG. 13 is a perspective view of the back side of the hose drive assembly 144. As shown in FIG. 12 and FIG. 13, hose drive assembly 144 may include a pair of support plates 290, 292. For example, hose drive assembly 144 may include a frontside support plate 290 and a backside support plate 292. The support plates 290, 292 may provide structure upon which a framework 200 may be connected. The support plates 290, 292 and the associated framework 200 may, for example, provide mounting structure to secure the hose drive assembly 144 in place at or near the distal end of the second conduit 36. The framework 200 may further provide a structure for mounting one or more of the rollers 117, 119, and 121 or for mounting a hose-support saddle (not shown). The frontside support plate 290 and the backside support plate 292 may, for example, be secured together using one or more bolts, screws, or pins 306 and appropriate connectors such as connecting nuts 310, for example.

As shown in FIG. 12, frontside support plate 290 may include a central opening 250 through which the conduit assembly 22 may engage. For example, the second conduit 36 of conduit assembly 22 may be held in place so that the distal end of the second conduit 36 is held in place at or adjacent to the central opening 250. For example, the distal end of the second conduit 36 may be held so that it engages with and passes through both central opening 250 and another opening 252 aligned with central opening 250 and formed by the framework 200. In some embodiments, one or more connecting fasteners or clips may be used to further help to secure the distal end of the second conduit 36 in position. With the distal end of the second conduit 36 secured in position, the suction hose 26 (which extends out from the distal end of the second conduit) may be positioned for engagement with one or more roller subassemblies disposed between the two support plates 290, 292. The suction hose 26 may then pass through an opening 254 formed by the backside support plate 292 (shown in FIG. 13).

In some embodiments, one or more roller subassemblies may be mounted to either or both of the supporting plates 290, 292. For example, each of right-side roller subassembly 92, left-side roller subassembly 94, top-side roller subassembly 96, and bottom-side roller subassembly 98 may be mounted to the backside support plate 292. In some embodiments, the backside support plate 292 may function like support plate 90 so that replacement of a damaged or worn roller subassembly 92, 94, 96, 98 may be easily accomplished by removing appropriate pins from the backside support plate 292 and dismounting a damaged or worn roller subassembly 92, 94, 96, 98. The roller subassemblies 92, 94, 96, 98 may be protected by frontside support plate 290. Alternatively, in some embodiments, roller subassemblies may be mounted to the frontside support plate 290.

Figure 14:
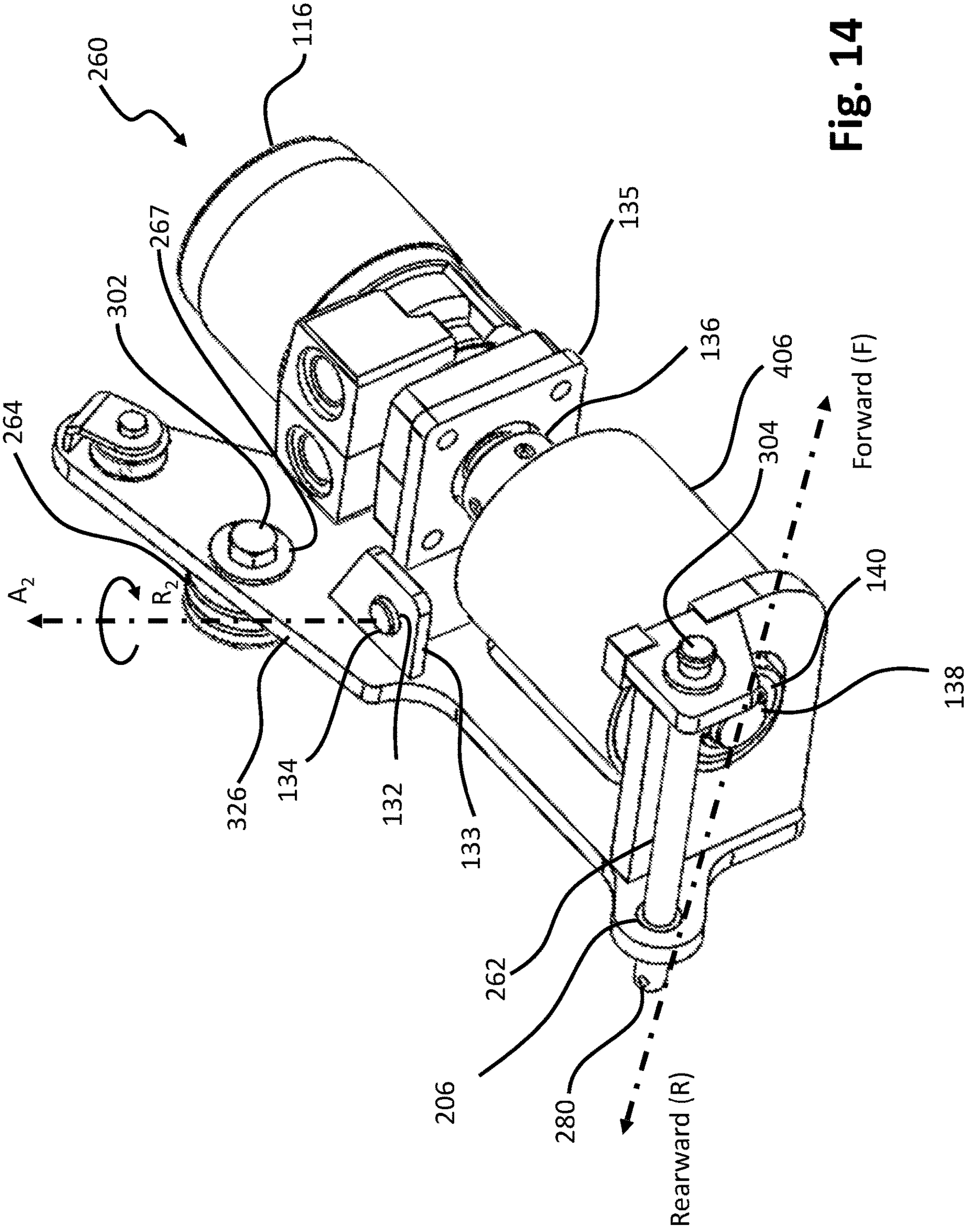
FIG. 14 is a perspective view of another exemplary embodiment of a roller subassembly.

In some embodiments, a roller subassembly 92, 94, 96, 98 may be mounted to both support plates 290, 292. For example, FIG. 14 shows an exemplary embodiment of a roller subassembly 260 which may be mounted to both the frontside support plate 290 and the backside support plate 292. For example, the roller subassembly 260 may be sandwiched between the two support plates 290, 292. In some embodiments, a plurality of roller subassemblies 260 may be sandwiched between the two support plates 290, 292. For example, a group of roller subassemblies 260 may be positioned at each of a right-side position, a left-side position, a top-side position, and a bottom-side position between the two support plates. Thus, in some embodiments, four roller subassemblies 260 may be used for driving extension and/or retraction of a suction hose 26. Alternatively, some other number of roller subassemblies 260 may be used such as between two to eight roller subassemblies 260, for example.

Roller subassembly 260 may include a bracket 326. The bracket 326 may support pivot opening 132 for receiving pivot 134, such as may be embodied as a pin, for example. The pivot opening 132 may be part of extension 133 of bracket 326. As described similarly for roller subassembly 96, pivot 134 may be aligned along the axis $A_2$ and configured for rotation $R_2$ about the axis $A_2$. Roller subassembly 260 may include a roller 406 coupled to a drive motor 116 and to a shaft 136. The shaft 136 may, for example, be the drive shaft of the motor 116 or a separate mounting shaft coupled thereto. The shaft 136 may be secured in place using connecting bracket 135. Bracket 135 may, for example, rotate with the pivot 134. The aforementioned structures 116, 136, 406 may be further supported in place by the bearing 138, which may, for example, secure the roller 406 within shaped opening 140.

Shaped opening 140 may be provided in the form of a slot, for example. The bearing 138 may, for example, comprise a sleeve bearing or bushing connected to the roller 406. Shaped opening 140 may be shaped so as to allow for controlled movement of the roller 406 connected thereto. For example, as similarly described for roller subassembly 96 (see FIGS. 8-10), the shaft 136 and bearing 138 may move in the shaped opening 140 either in a forward direction (F) or in a rearward direction (R) thereby causing roller 406 to pivotably move about the pivot axis $A_2$. Movement of the roller 406 may facilitate controlled rotation of the suction hose 26 as it is extended and retracted so as to lessen or eliminate a need for manual rotation of the suction hose during its lifetime or provide other advantages.

In some embodiments, roller subassembly 260 may be secured to each of the frontside support plate 290 and the backside support plate 292. For example, roller subassembly 260 may be secured to the backside support plate 292 through each of a first pin or rod 302 and a second pin or rod 262. Alternatively, the roller subassembly 260 may be secured to the backside support plate 292 using screws or fasteners, for example. First pin or rod 302 (shown in FIGS. 12-14) may, for example, extend through a hole in the bracket 326 and a corresponding hole in the backside support plate 292. First pin or rod 302 may, for example, be held in place by a connecting nut 264 and a washer 267 or using another suitable connector. Second pin or rod 262 may, for example, comprise a rod secured using a cotter pin. Second pin or rod 262 may be positioned through an opening 206 formed in the bracket 326 and through a corresponding hole made in the backside support plate 292. For example, as shown in FIG. 13, a first end 280 of the second pin or rod 262 extends through a hole in the backside support plate 292. A cotter pin (not shown) may secure the second pin or rod 262 in place at the first end 280. As shown in FIG. 12, a second end 304 of the second pin or rod 262 may extend through frontside support plate 290.

Figure 9B:
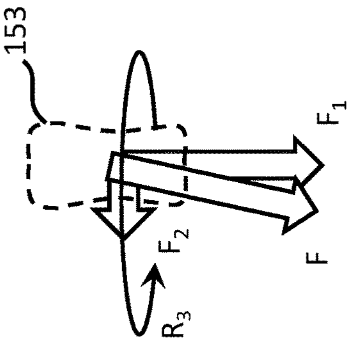
FIG. 9B is a top-side plan view schematic diagram of forces that may be incident on a suction hose when the suction hose is engaged with the hose drive assembly of FIG. 9A.

As described herein, in some embodiments, a hose drive assembly 44, 144 may include one or more roller subassemblies 92, 94, 96, 98 (see FIG. 6 and FIG. 8) and 260 (see FIG. 14) including a respective roller 102, 104, 106, 108, 406 mounted on a supporting bracket 126, 326 so as to enable pivoting movement of the respective roller. For example, a given roller 102, 104, 106, 108, 406 may be pivoted from a neutral position wherein the force applied by the roller 102, 104, 106, 108, 406 on the hose 26 is substantially directed along the longitudinal axis of the hose 26 to either of a rearward position (see FIG. 9A) or a forward position (see FIG. 10A). In each of the rearward position and forward position, at least a component of the force applied on the hose 26 (see force $F_2$ of FIG. 9B applied by roller 106 when it is positioned rearwardly of the neutral position, and force $F_4$ of FIG. 10B applied by roller 106 when it is pivoted forwardly of the neutral position) may be directed perpendicularly to the longitudinal axis of the hose 26. In some embodiments, as shown in FIGS. 9B and 10B, respective forces $F_2$ (shown in FIG. 9B) and $F_4$ (shown in FIG. 10B) applied on the hose 26 during extension and retraction may be generally aligned in the same direction so that the hose 26 may be continuously rotated in a common direction. This may be useful in preventing the hose 26 from rotating along a set pattern during its lifetime so as to extend its useful lifetime and/or reduce maintenance costs associated with manually rotating the hose.

Figure 15A:
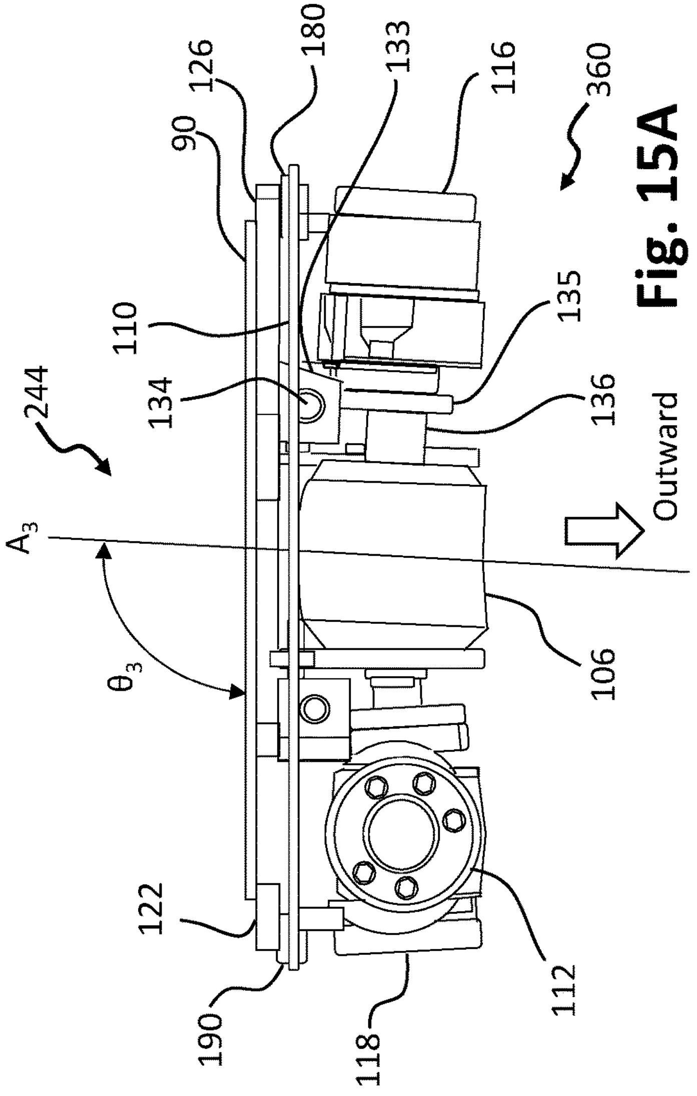
FIG. 15A is a top-side plan view of an exemplary embodiment of a hose drive assembly as it may be positioned when engaged with a suction hose.

In some embodiments, a hose drive assembly may include a roller subassembly including a roller that may be secured in place on a supporting mount or bracket without providing for pivoting movement of the roller. In some such embodiments, a roller may still be used to rotate a hose 26. For example, FIG. 15A is a top-plan view of another exemplary embodiment of a hose drive assembly 244. The hose drive assembly 244 may include one or more roller subassemblies 360 (shown in FIG. 16). In some embodiments, the roller subassembly 360 may include a roller 106 that may be secured to a bracket 526. For example, a mounting shaft 136 may be coupled to the roller 106 and secured in place to the bracket 526 via an extension 335. The extension 335 may, for example, be secured to the bracket 526 through intermediate bracket 333, which may, for example, be a solid bracket without an opening formed therein. This may, for example, be compared with some embodiments of hose drive assembly 44. Particularly, as shown in FIG. 8, hose drive assembly 44 may, in some embodiments, include a roller 106 mounted on a shaft 136 which is secured to the bracket 126 via an extension 133. The extension 133 may including an opening 132 configured for mounting a pivot 134 (e.g., a pivot pin).

Figure 16:
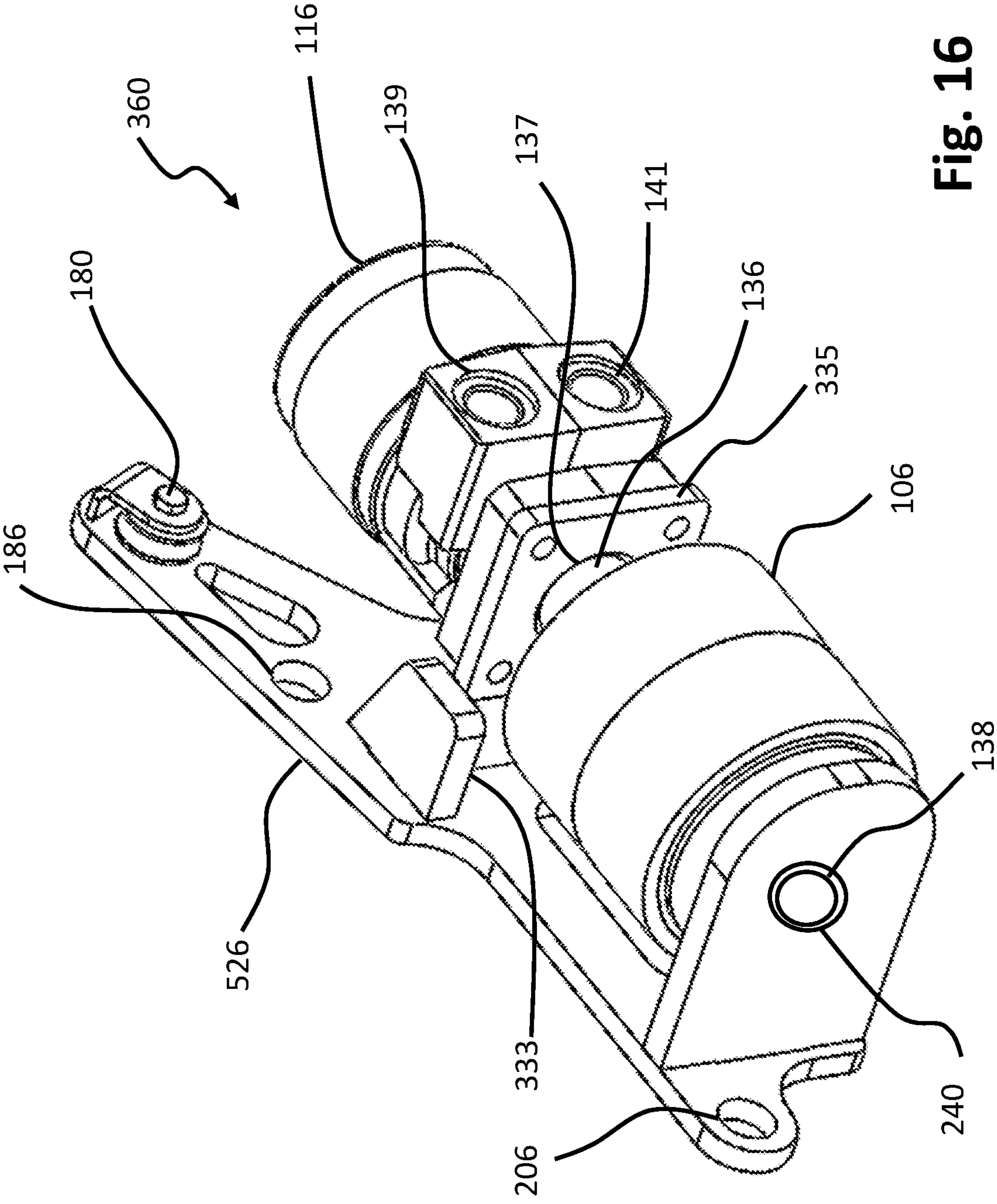
FIG. 16 is a perspective view taken from the front side of another exemplary embodiment of a roller subassembly.

As shown in FIG. 15A, the roller 106 may further be secured to the bracket 526 through an opening 240 (shown in FIG. 16). As shown in FIG. 16, the opening 240 may include a bearing 138 for supporting rotation of the drive shaft 136. However, the opening 240 may be configured to otherwise hold the drive shaft 136 so that it may not translate forwardly or rearwardly. The opening 240 may be compared with the shaped opening 140 provided in each of roller subassembly 96 (see FIG. 8) and roller subassembly 260 (see FIG. 14). Particularly, opening 240 may be sized or otherwise configured to hold the roller 106 in a position fixed against translational movement of the roller 106. In contrast, shaped opening 140 may, in some embodiments, allow for translation of the roller 106 so that it may, for example, be moved either forwardly or rearwardly of a neutral position as described above.

Figure 15B:
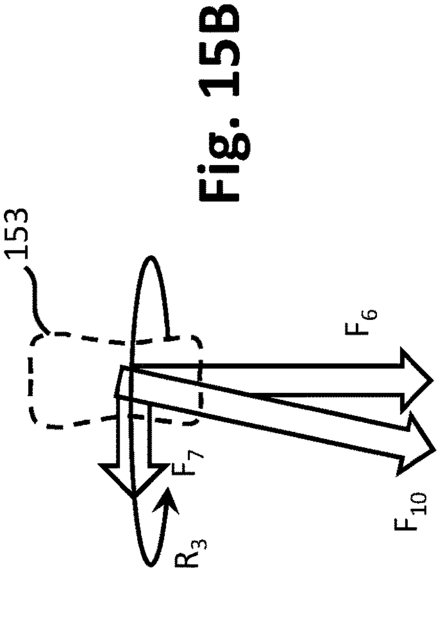
FIG. 15B is a top-side plan view schematic diagram of forces that may be incident on a suction hose when the suction hose is engaged with the hose drive assembly of FIG. 15A in a process of extending the hose outwards.
Figure 15C:
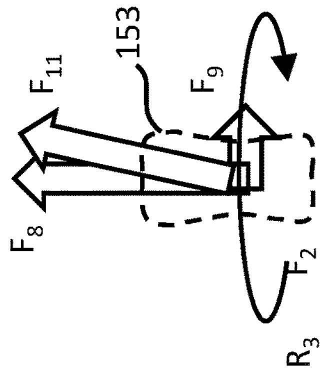
FIG. 15C is a top-side plan view schematic diagram of forces that may be incident on a suction hose when the suction hose is engaged with the hose drive assembly of FIG. 15A in a process of retracting the hose inwards.

In some embodiments, the roller 106 may be allowed to rotate when extending or retracting a hose 26 (e.g., a suction hose) but may otherwise be substantially secured in place so that it may not, for example, engage in translating movements (e.g., forward movements or rearward movements). In some of those embodiments, the roller 106 may still drive rotation (e.g., clockwise or counterclockwise rotation) of the hose 26 viewed from a position towards which the hose may be extended. For example, the roller 106 may be positioned so that it applies a force along a transverse direction to the longitudinal axis of the hose 26. As shown in FIG. 15A, the roller 106 may, for example, be secured in place at an angle $\theta_3$ formed between an underlying support plate 90 (normal to the longitudinal axis of the hose 26) and the axis $A_3$ (the normal axis of the roller 106). The angle $\theta_3$ may, for example, be an obtuse angle so that it is greater than 90 degrees. In some embodiments, the angle $\theta_3$ may range from about 91 degrees to about 95 degrees. Alternatively, the angle $\theta_3$ may be an acute angle so that it is somewhat less than 90 degrees. For example, in some embodiments, the angle $\theta_3$ may range from about 89 degrees to about 85 degrees. When positioned at the angle $\theta_3$, the roller 106 applies a force F directed at an angle relative to the longitudinal axis of suction hose 26. For example, as shown in FIG. 15B, as similarly described for hose drive assembly 44 (see FIG. 9A with roller 106 positioned at angle $\theta_1$), roller 106 may apply a force $F_{10}$, over a contact area 153, when extending the hose outwards. The force provided during extension of the hose may include a first component $F_6$ directed along the longitudinal axis of the suction hose 26 and a second component $F_7$ that is directed in a transverse direction to the suction hose 26. The force $F_6$ will drive extension of the hose 26 so that the direction of hose 26 extension is in the same direction as the force vector $F_6$. The force $F_7$ will tend to rotate the hose 26 in the direction shown by $R_3$. For example, the hose 26 may be rotated in a counterclockwise direction (when viewed from the front side of hose drive assembly 244) in response to the force $F_7$ when the hose 26 is being extended and the angle $\theta_3$ is greater than 90 degrees. Likewise, as shown in FIG. 15C, roller 106 may apply a force $F_1$, when retracting the hose 26 inwards, which includes a first component $F_8$ directed along the longitudinal axis of the hose 26 (aligned along the direction of hose retraction) and a second component $F_9$ that is directed in a transverse direction to the hose 26. Because the forces $F_7$ and $F_9$ are generally in opposite directions, the hose 26 will move in opposite directions during extension and retraction of the hose 26.

In some embodiments, a hose drive assembly 244 may be configured so that a component force $F_7$, $F_9$ that is directed transverse to the hose 26 may be configured so as to allow for slippage of the hose. For example, either or both of the forces $F_7$, $F_9$ may only intermittently engage the hose so as to cause rotation. This may be useful in preventing the hose 26 from rotating along a set pattern during its lifetime so as to extend its useful lifetime and/or reduce maintenance costs associated with manually rotating the hose. In some embodiments, a hose drive assembly may include one or more roller subassemblies that may be configured to drive extension and retraction of a hose 26 using different forces of engagement. For example, a force $F_{10}$ applied when extending the hose 26 may be the same or different from a force $F_{11}$ applied when retracting the hose 26. In some embodiments, the force $F_{11}$ may be configured so that the hose 26 may be effectively driven inwards during retraction. However, the related force $F_9$ may be small enough so that the hose is not rotated during retraction or only sporadically rotated during retraction. Accordingly, the hose will generally be rotated effectively during extension but not effectively rotated during retraction. This may be useful in preventing the hose 26 from rotating along a set pattern during its lifetime so as to extend its useful lifetime and/or reduce maintenance costs associated with manually rotating the hose. Other mechanisms may be used for preventing a hose 26 from reproducibly extending and retracting in a set pattern so that the hose 26 does not wear in an irregular manner.

Although the foregoing specific details describe certain embodiments of this invention, persons of ordinary skill in the art will recognize that various changes may be made in the details of this invention without departing from the spirit and scope of the invention as defined in the appended claims and other claims that may be drawn to this invention and considering the doctrine of equivalents. Among other things, any feature described for one embodiment may be used in any other embodiment, and any feature described herein may be used independently or in combination with other features. Also, unless the context indicates otherwise, it should be understood that when a component is described herein as being mounted or connected to another component, such mounting or connection may be direct with no intermediate components or indirect with one or more intermediate components. Although embodiments described herein are described as having a suction hose, it will be understood that some embodiments may have a hose used for blowing, suction, or a combination thereof. Therefore, it should be understood that this invention is not to be limited to the specific details shown and described herein.

What is claimed is:

1. A vehicle comprising:
- a hose; and
- a hose drive assembly configured for driving extension and retraction of the hose, the hose drive assembly comprising:
  - a plurality of roller subassemblies, at least one of the plurality of roller subassemblies comprising a powered roller, said powered roller being adjustably mounted so that it is movable to a first position during extension of the hose and movable to a second position during retraction of the hose;
  - wherein said powered roller is configured to engage the hose so as to rotate the hose in a direction with the powered roller in said first position and to rotate the hose in the same direction with the powered roller in said second position.

2. The vehicle of claim 1, said powered roller being mounted to a pivot so that the powered roller is rotated about the pivot as the powered roller is moved to one of said first position and said second position.

3. The vehicle of claim 2 wherein a mounting shaft of the powered roller is rotatably and slidably secured in a shaped opening of a bracket wherein rotation of the powered roller about the pivot provides for movement of the mounting shaft in the shaped opening.

4. The vehicle of claim 1, the hose drive assembly further comprising:
- a bracket for supporting the powered roller, the bracket including a shaped opening;
- wherein a mounting shaft of the powered roller is rotatably secured in the shaped opening; and
- wherein the mounting shaft is configured to slide within the shaped opening.

5. The vehicle of claim 4, the hose drive assembly further comprising:
- a bearing configured for securing the powered roller in the shaped opening, the shaped opening and the bearing being configured so that a reaction force applied to the powered roller by said hose during said extension moves the mounting shaft within the shaped opening such that the powered roller is moved to said first position.

6. The vehicle of claim 1, wherein said powered roller is adjustably mounted to a support bracket so that a reaction force applied on the powered roller by said hose as the hose is extended moves the powered roller to said first position.

7. A vehicle comprising:
- a boom assembly comprising a conduit assembly including a hose, the conduit assembly being secured to a telescopically extendable and retractable support assembly; and
- a hose drive assembly coupled to the conduit assembly and configured for driving extension and retraction of said hose, the hose drive assembly comprising:
  - a support plate; and
  - a plurality of roller subassemblies mounted to the support plate, each of the plurality of roller subassemblies comprising:
    - a bracket connecting the respective roller subassembly to said support plate, the bracket including a shaped opening;
    - a pivot connected to the bracket; and
    - a powered roller connected to a drive shaft of a motor, the powered roller being adjustably mounted to said bracket via said shaped opening and pivotably mounted to said pivot.

8. The vehicle of claim 7 wherein the support assembly is comprised of a first support, a second support, and a third support;
- wherein the second support is configured for nested engagement within said first support, and the third support is configured for nested engagement within said second support.

9. The vehicle of claim 8, the boom assembly further comprising:
- a drive system mounted to the support assembly, the drive system including:
  - an extension chain configured for driving telescopic extension of the third support from the second support; and a retraction chain configured for driving telescopic retraction of the third support within the second support.

10. The vehicle of claim 7 wherein said powered roller is adjustably mounted to said bracket so that a first reaction force applied on the powered roller by said hose as the hose is extended moves the powered roller to a first position; and wherein a second reaction force applied on the powered roller by said hose as the hose is retracted moves the powered roller to a second position.

11. The vehicle of claim 10 wherein said powered roller is configured to engage the hose so as to rotate the hose in a direction with the powered roller in said first position and to rotate the hose in the same direction with the powered roller in said second position.

12. The vehicle of claim 7 wherein said plurality of roller subassemblies are movably mounted to the support plate via one or more pins.

13. The vehicle of claim 12 further comprising a tensioning cable engaged with the plurality of roller subassemblies.

* * * * *